(12) United States Patent
Christopher

(10) Patent No.: US 9,874,197 B2
(45) Date of Patent: Jan. 23, 2018

(54) TURBINE SYSTEM AND METHOD

(71) Applicant: Verterra Energy Inc., Minneapolis, MN (US)

(72) Inventor: Theodore J. Christopher, Minneapolis, MN (US)

(73) Assignee: Verterra Energy Inc., Minneapolis, MN (US)

( * ) Notice: Subject to any disclaimer, the term of this patent is extended or adjusted under 35 U.S.C. 154(b) by 128 days.

(21) Appl. No.: 14/925,000

(22) Filed: Oct. 28, 2015

(65) Prior Publication Data

US 2017/0122283 A1 May 4, 2017

(51) Int. Cl.
| | |
|---|---|
| *F03B 13/00* | (2006.01) |
| *H02P 9/04* | (2006.01) |
| *F03B 13/10* | (2006.01) |
| *F03B 17/06* | (2006.01) |
| *F03B 13/26* | (2006.01) |
| *F03D 7/00* | (2006.01) |

(52) U.S. Cl.
CPC ............ *F03B 13/10* (2013.01); *F03B 13/264* (2013.01); *F03B 17/062* (2013.01); *F05B 2220/32* (2013.01); *F05B 2220/706* (2013.01); *F05B 2240/13* (2013.01); *F05B 2240/24* (2013.01); *F05B 2240/97* (2013.01); *Y02E 10/22* (2013.01); *Y02E 10/223* (2013.01); *Y02E 10/226* (2013.01); *Y02E 10/28* (2013.01); *Y02E 10/72* (2013.01); *Y02E 10/74* (2013.01)

(58) Field of Classification Search
USPC ............................................. 290/54; 415/4.2
See application file for complete search history.

(56) References Cited

U.S. PATENT DOCUMENTS

| | | | |
|---|---|---|---|
| 372,148 A | 10/1887 | Henderson | |
| 1,027,501 A | 5/1912 | Pearson | |
| 3,928,771 A * | 12/1975 | Straumsnes | ........... F03B 17/065 290/43 |
| 4,045,148 A | 8/1977 | Morin | |
| 4,084,918 A * | 4/1978 | Pavlecka | ................... F03D 1/04 290/55 |
| 4,088,419 A * | 5/1978 | Hope | ....................... F03D 3/02 290/55 |

(Continued)

FOREIGN PATENT DOCUMENTS

| | | |
|---|---|---|
| EP | 0 439 267 | 3/1994 |
| JP | 2005-054724 | 3/2005 |

(Continued)

OTHER PUBLICATIONS

BioPower Systems images, Australia, 2 pages [publicly available prior to Nov. 12, 2010]. Retrieved from the Internet: <URL: http://www.biopowersystems.com/images.php>.

(Continued)

*Primary Examiner* — Pedro J Cuevas
(74) *Attorney, Agent, or Firm* — Fish & Richardson P.C.

(57) ABSTRACT

Some embodiments of a turbine system described herein provide a turbine that rotates in response to fluid flow, and include a rampart device that remains relatively stationary compared to the turbine and is shaped to affect fluid flow for effective power generation. The rotation of the turbine can drive a generator to output electrical energy.

29 Claims, 10 Drawing Sheets

(56) References Cited

U.S. PATENT DOCUMENTS

| | | | |
|---|---|---|---|
| 4,156,580 A * | 5/1979 | Pohl | F03D 3/02 |
| | | | 290/55 |
| 4,191,505 A * | 3/1980 | Kaufman | F03D 3/0463 |
| | | | 415/101 |
| 4,278,896 A * | 7/1981 | McFarland | F03D 3/02 |
| | | | 290/44 |
| 4,289,971 A | 9/1981 | Ueda | |
| 4,368,392 A | 1/1983 | Drees | |
| 4,416,584 A | 11/1983 | Norquest | |
| 4,448,669 A | 5/1984 | Scinta | |
| 4,664,596 A | 5/1987 | Wood | |
| 4,686,376 A | 8/1987 | Retz | |
| 4,900,227 A | 2/1990 | Trouplin | |
| 4,958,986 A | 9/1990 | Boussuges | |
| 4,960,363 A * | 10/1990 | Bergstein | F03B 13/264 |
| | | | 290/53 |
| 5,083,899 A * | 1/1992 | Koch | F03D 3/0481 |
| | | | 415/2.1 |
| 5,137,417 A | 8/1992 | Lund | |
| 5,252,029 A | 10/1993 | Barnes | |
| 5,332,354 A * | 7/1994 | Lamont | F03D 3/0463 |
| | | | 415/2.1 |
| 5,447,412 A * | 9/1995 | Lamont | F03D 3/0463 |
| | | | 415/2.1 |
| D368,480 S | 4/1996 | Thirumalaisamy et al. | |
| D377,199 S | 1/1997 | Vermy | |
| 5,664,418 A | 9/1997 | Walters | |
| 5,852,331 A | 12/1998 | Giorgini | |
| 5,969,430 A * | 10/1999 | Forrey | F03D 3/0463 |
| | | | 290/44 |
| 5,971,820 A | 10/1999 | Morales | |
| 6,132,172 A | 10/2000 | Li | |
| 6,135,716 A | 10/2000 | Billdal et al. | |
| 6,158,953 A * | 12/2000 | Lamont | B64C 11/007 |
| | | | 415/125 |
| 6,448,668 B1 | 8/2002 | Robitaille | |
| 6,638,005 B2 * | 10/2003 | Holter | F03D 3/005 |
| | | | 415/151 |
| 6,942,454 B2 * | 9/2005 | Ohlmann | F03D 3/02 |
| | | | 290/55 |
| 6,981,839 B2 * | 1/2006 | Fan | F03D 3/002 |
| | | | 290/55 |
| 7,040,859 B2 | 5/2006 | Kane | |
| 7,108,482 B2 | 9/2006 | Chapman | |
| 7,198,470 B2 | 4/2007 | Enomoto et al. | |
| D543,495 S | 5/2007 | Williams | |
| 7,284,949 B2 | 10/2007 | Haworth | |
| D554,546 S | 11/2007 | Hart | |
| D564,042 S | 3/2008 | Roy | |
| 7,341,424 B2 | 3/2008 | Dial | |
| 7,344,353 B2 | 3/2008 | Naskali et al. | |
| 7,441,988 B2 | 10/2008 | Manchester | |
| 7,471,009 B2 | 12/2008 | Davis et al. | |
| D587,195 S | 2/2009 | Van Wijck | |
| 7,492,054 B2 | 2/2009 | Catlin | |
| 7,494,315 B2 | 2/2009 | Hart | |
| 7,498,683 B2 | 3/2009 | Landwehr | |
| D594,818 S | 6/2009 | Doucet | |
| 7,573,148 B2 | 8/2009 | Nica | |
| 7,728,454 B1 | 6/2010 | Anderson, Jr. | |
| 7,736,127 B1 | 6/2010 | Carr | |
| 7,791,214 B2 | 9/2010 | Hill | |
| 8,083,438 B2 * | 12/2011 | Bailey | A01G 15/00 |
| | | | 405/195.1 |
| D652,794 S * | 1/2012 | Christopher | D13/115 |
| 8,096,749 B2 * | 1/2012 | Yang | F03D 3/0481 |
| | | | 415/4.2 |
| 8,167,533 B2 * | 5/2012 | Lucy | F03D 3/02 |
| | | | 415/4.2 |
| 8,432,056 B2 * | 4/2013 | Bailey | F03B 1/02 |
| | | | 290/43 |
| 8,487,468 B2 * | 7/2013 | Christopher | F03B 3/121 |
| | | | 290/54 |
| 8,591,170 B1 * | 11/2013 | Rawls | F03D 3/002 |
| | | | 415/211.1 |
| 8,616,830 B2 * | 12/2013 | Unno | F03B 3/183 |
| | | | 290/43 |
| 8,624,420 B2 * | 1/2014 | Christopher | F03B 3/121 |
| | | | 290/54 |
| 8,777,556 B2 * | 7/2014 | O'Neil | F03D 3/002 |
| | | | 415/147 |
| 8,840,360 B2 * | 9/2014 | Quintal | F03D 3/002 |
| | | | 415/4.1 |
| D715,223 S | 10/2014 | Pepis | |
| 9,115,685 B2 * | 8/2015 | Ross | F03B 13/264 |
| 9,291,146 B2 * | 3/2016 | Christopher | F03B 3/121 |
| 9,322,385 B1 | 4/2016 | Hallett | |
| 2003/0053909 A1 | 3/2003 | O'Hearen | |
| 2004/0223840 A1 | 11/2004 | Vogiatzis et al. | |
| 2005/0169742 A1 | 8/2005 | Kane | |
| 2005/0285407 A1 | 12/2005 | Davis et al. | |
| 2006/0198724 A1 | 9/2006 | Bertony | |
| 2006/0233647 A1 | 10/2006 | Saunders | |
| 2007/0258806 A1 | 11/2007 | Hart | |
| 2009/0026767 A1 | 1/2009 | Petrounevitch | |
| 2009/0047131 A1 | 2/2009 | Neumann | |
| 2009/0194997 A1 | 8/2009 | Stabins | |
| 2010/0025998 A1 | 2/2010 | Williams | |
| 2010/0135768 A1 * | 6/2010 | Pitre | F03B 17/063 |
| | | | 415/7 |
| 2010/0148509 A1 | 6/2010 | Ortiz | |
| 2010/0213271 A1 * | 8/2010 | Bailey | A01G 15/00 |
| | | | 239/14.1 |
| 2010/0213716 A1 * | 8/2010 | Santoro | F03D 1/04 |
| | | | 290/54 |
| 2010/0213720 A1 * | 8/2010 | Bailey | F03B 1/02 |
| | | | 290/55 |
| 2010/0276935 A1 | 11/2010 | Dehlsen et al. | |
| 2010/0283251 A1 | 11/2010 | Reynolds | |
| 2011/0018277 A1 | 1/2011 | Brace | |
| 2012/0098262 A1 | 4/2012 | Da Cunha | |
| 2012/0119500 A1 * | 5/2012 | Christopher | F03B 3/121 |
| | | | 290/54 |
| 2012/0294705 A1 | 11/2012 | Unno | |
| 2013/0294922 A1 * | 11/2013 | Christopher | F03B 3/121 |
| | | | 416/235 |
| 2013/0333370 A1 * | 12/2013 | Hopper | F03B 13/08 |
| | | | 60/495 |
| 2014/0110946 A1 | 4/2014 | Christopher | |
| 2014/0145445 A1 | 5/2014 | Richer et al. | |
| 2014/0284925 A1 | 9/2014 | Ross | |
| 2016/0195058 A1 * | 7/2016 | Christopher | F03B 3/121 |
| | | | 416/223 A |

FOREIGN PATENT DOCUMENTS

| | | |
|---|---|---|
| JP | 2007-303459 | 11/2007 |
| JP | 2010-537100 | 12/2010 |
| JP | 2011-509368 | 3/2011 |
| KR | 10-0854793 | 8/2008 |
| KR | 10-2009-0080275 | 7/2009 |
| WO | 2009/086593 | 7/2009 |
| WO | 2010/116983 | 10/2010 |

OTHER PUBLICATIONS

Dan Haugen, "Minnesota startup hopes to spin out new hydroturbine design," Midwest Energy News (Jun. 28, 2012) [retrieved on Jul. 3, 2012], at http://www.midwestenergynews.com/2012/06/28/minnesota-startup-hopes-to-spin-out-new-hydroturbine-design/, 2 pages.

Pacella, Rena Marie. 'Invention Awards: A Fish-Friendly Tidal Turbine' [online]. Popular Science, May 20 2010, 3 pages [retrieved on Nov. 15, 2010]. Retrieved from the Internet: <URL: http://www.popsci.com/diy/article/2010-05/invention-awards-fish-friendly-tidal-turbine>.

Pelamis Wave Power, 1 page [publicly available prior to Nov. 12, 2010]. Retrieved from the Internet: <URL: http://www.pelamiswave.com/our-technology/pelamis-wec>.

(56) References Cited

OTHER PUBLICATIONS

Verdant Power, 2009, 2 pages [publicly available prior to Nov. 12, 2010]. Retrieved from the Internet: <URL: http://verdantpower.com/what-systemsint/>.
International Search Report in Written Opinion in International Application No. PCT/US2016/059362, dated Dec. 29, 2016, 13 pages.
Pacella, 'Invention Awards: A Fish-Friendly Tidal Turbine' [online]. Popular Science, May 20, 2010, 3 pages [retrieved on Nov. 15 2010]. Retrieved from the Internet: <URL: http://www.popsci.com/diy/article/2010-05/invention-awards-fish-friendly-tidal-turbine>.

* cited by examiner

TURBINE SYSTEM AND METHOD

TECHNICAL FIELD

This document relates to a turbine system, for example, that rotates to generate electrical power from fluid flow.

BACKGROUND

Various turbine systems generate electrical power in response to rotation of a turbine. For example, numerous wind turbine systems attempt to harvest the wind energy from air flow over a set of wind turbine blades, which drive the wind turbine blades to rotate about an axis and thereby drive an internal generator to output electrical energy. In another example, conventional hydro turbine systems seek to convert energy from water currents in rivers or tidal currents in oceans or seas into electrical energy. Some turbine systems include turbines that rotate about a vertical axis, for example, in response to fluid flow in a direction generally perpendicular to the vertical axis.

SUMMARY

Some embodiments of a turbine system described herein provide a turbine that rotates in response to off-axis fluid flow, such as water flowing in a generally horizontal direction generally perpendicular to a vertical axis of rotation, for example, and a rampart device that may act as a shield apparatus and may direct and control flow upstream or otherwise proximate the turbine. The turbine system can employ a synergistic combination of fluid dynamics principals to harvest the kinetic energy of moving water or other fluid for conversion into mechanical rotary motion. For example, the turbine system can provide a vertical-axis turbine that rotates in one direction regardless of the direction of the fluid flow, and that may be positioned with a rampart device that directs flow proximate the turbine to protect and promote energy harvesting by the turbine system.

In some embodiments, an exemplary turbine system for submersed use in an electrical generation system includes a vertical-axis turbine that rotates about an axis in response to fluid flowing toward the turbine in a flow direction that is generally perpendicular to the axis. The vertical-axis turbine includes an upper surface and a plurality of upwardly protruding fins extending from an outer region proximate an outer periphery of the vertical-axis turbine. A rampart device may be positioned at least partially under the vertical-axis turbine and configured to remain generally stationary during rotation of the vertical-axis turbine, the rampart device including a front region, at least a portion of the front region extending to a vertical height greater than an outer periphery of the vertical-axis turbine.

Implementations can include any, all, or none of the following features. At least a portion of the front region of the rampart device may extend to a vertical height greater than an uppermost portion of the vertical-axis turbine when positioned for use. The uppermost portion of the vertical-axis turbine may be a ridge of a fin. The front region of the rampart device may include an upwardly sloping surface extending between a leading edge of the rampart device and an uppermost portion of the rampart device. The rampart device may further include a tail region and a turbine-receiving region positioned at least partially between the front region and the tail region. The turbine-receiving region of the rampart device may define a recess, the vertical-axis turbine positionable at least partially within the recess. The recess may be defined at least in part by a curved wall having a height that is greater near the front region than at the tail region. The curved wall may include an aperture extending through the wall between an interior of the recess and an exterior of the rampart device. The rampart device may be asymmetric about the vertical axis. The rampart device may include a tail portion having an upwardly facing major surface, at least a portion of the upwardly facing major surface positioned below an outer periphery of the vertical-axis turbine. The rampart device may include lateral flared regions. The rampart device may include at least the front region and turbine-receiving region as an integrally formed, unitary structure. The upwardly protruding fins of the vertical-axis turbine extend to a vertical height greater than an uppermost portion of the upper surface. The vertical-axis turbine may include a continuously solid upward facing surface having a generally circular outer periphery. The upper surface and upwardly protruding fins may be an integrally formed, unitary structure. The fins may be fixedly positioned relative to the upper surface. Each fin may include opposite convex and concave surfaces, and both of the convex and concave surfaces are upwardly facing surfaces. The system may further include a base structure positioned below the vertical-axis turbine and have one or more anchor legs extending away from the vertical-axis turbine. The system may further include a drive shaft extending from the vertical-axis turbine to an electrical generator component. The upper surface may include a convex surface. The system may further include an electrical generator positioned to generate power in response to rotation of the vertical-axis turbine. The electrical generator may be electrically connected to an onshore electronics system that conditions electrical power for output to an external power grid.

In some embodiments, a rampart device for use with a rotatable turbine in an off-axis fluid flow of a submersed environment for electrical power generation is provided. The rampart device may include a body including a front region, tail region, and turbine-receiving region positioned at least partially between the front region and the tail region. The front region may include an upwardly sloping surface having an uppermost portion and the turbine-receiving region may include a recess including a base surface configured to receive a rotatable turbine, and wherein the uppermost portion extends to a vertical height higher than the base surface.

Implementations can include any, all, or none of the following features. The turbine-receiving portion may be configured to receive the rotatable turbine such that the body does not rotate with the rotatable turbine. The recess is defined at least in part by a curved wall having a height that is greater near the front region than at the tail region. The curved wall portion may include an aperture extending through the wall between an interior of the recess and an exterior of the body. The rampart device may be asymmetric about the vertical axis. The tail portion may include an upwardly facing major surface, at least a portion of the upwardly major surface positioned below the base surface when in use. The rampart device may include lateral flared regions. The front region and turbine-receiving region may be an integrally formed, unitary structure.

In some embodiments, a method of using a turbine system for generating electrical power from fluid flow is provided, including positioning a turbine and rampart device underwater, the turbine including a continuously solid upward facing surface and a plurality of upwardly protruding fins extending from an outer region proximate an outer periphery of the turbine, the rampart device positioned at least partially under the turbine and configured to remain generally stationary during rotation of the turbine, the rampart device including a front region, at least a portion of the front region extending to a vertical height greater than an outer periphery of the turbine, and generating electrical power in response to rotation of the turbine caused by water flowing over the rampart device and turbine and interacting with the plurality of fins.

Implementations can include any, all, or none of the following features. The turbine may be a vertical-axis turbine configured to rotate about a vertical axis in response to fluid flowing toward the turbine in a flow direction that is generally perpendicular to the vertical axis. The generating step may include generating electrical power from an electrical generator positioned between the turbine and a base structure so as to generate electrical power in response to rotation of the turbine relative to the base structure. The generating step may include generating electrical power from a pump mechanism positioned between the turbine and a base structure so as to force hydraulic fluid to an onshore generator system in response to the rotation of the turbine relative to the base structure. At least a portion of the front region of the rampart device may extend to a vertical height greater than an uppermost portion of the turbine when positioned for use. An upper surface of the turbine and the upwardly protruding fins may be an integrally formed, unitary structure. The front region and turbine-receiving region of the rampart device may be an integrally formed, unitary structure. The upwardly protruding fins of the turbine may extend to a vertical height greater than an uppermost region of an upper surface of the turbine. The fins may be fixedly positioned relative to an upper surface of the turbine. Each fin may include opposite convex and concave surfaces, and both of the convex and concave surfaces may be upwardly facing surfaces.

In some embodiments, a turbine system for use in an electrical generation system is provided, including a turbine that rotates about a vertical axis in response to fluid flowing toward the turbine in a flow direction that is generally perpendicular to the vertical axis, the turbine including a upper surface and a plurality of upwardly protruding fins extending from an outer region proximate an outer periphery of the turbine, the upper surface and fins forming a continuously solid upward facing surface, and the upwardly protruding fins extend to a height greater than an uppermost portion of the upper surface, a rampart device positioned at least partially under the turbine and configured to remain generally stationary during rotation of the turbine, the rampart device including a front region, at least a portion of the front region extending to a vertical height greater than the upwardly protruding fins, an electrical generator connected with the turbine so as to generate electrical power in response to rotation of the turbine, and an onshore electronics system electrically connected to the electrical generator that conditions electrical power for output to an external power grid.

Implementations can include any, all, or none of the following features. The turbine may be a vertical-axis turbine configured to rotate about a vertical axis in response to fluid flowing toward the turbine in a flow direction that is generally perpendicular to the vertical axis. At least a portion of the front region of the rampart device may extend to a vertical height greater than an uppermost portion of the turbine when positioned for use. The upper surface and upwardly protruding fins may be an integrally formed, unitary structure. The front region and turbine-receiving region of the rampart device may be an integrally formed, unitary structure. The upwardly protruding fins of the turbine may extend to a vertical height greater than an uppermost region of the upper surface. Each fin may include opposite convex and concave surfaces, and both of the convex and concave surfaces may be upwardly facing surfaces.

In some embodiments, a turbine system for use in an electrical generation system is provided, including: a turbine including a plurality of upwardly protruding fins extending to a vertical height greater than an uppermost region of a upper surface of the turbine, wherein each fin includes opposite convex and concave surfaces, and both of the convex and concave surfaces are upwardly facing surfaces, means for affecting fluid flow upstream of the turbine, and means for generating electrical power from rotation of the turbine. Implementations can include any, all, or none of the following features. The turbine may be a vertical-axis turbine configured to rotate about a vertical axis in response to fluid flowing toward the turbine in a flow direction that is generally perpendicular to the vertical axis.

In some embodiments, a turbine system for use in an electrical generation system is provided, including a turbine including a plurality of upwardly protruding fins, and a rampart device positioned proximate the turbine and configured to remain generally stationary during rotation of the turbine. Implementations can include any, all, or none of the following features. The turbine is a vertical-axis turbine configured to rotate about a vertical axis in response to fluid flowing toward the turbine in a flow direction that is generally perpendicular to the vertical axis.

In some embodiments, a method of manufacturing a turbine system for use in generating electrical power is provided, including molding a turbine such that a plurality of fins of the turbine are formed as a unitary structure including an upper surface and a plurality of upwardly protruding fins extending from an outer region proximate an outer periphery of the vertical-axis turbine, molding a rampart device positioned at least partially under the turbine and configured to remain generally stationary during rotation of the vertical-axis turbine, the rampart device including a front region, at least a portion of the front region extending to a vertical height greater than an outer periphery of the vertical-axis turbine, and mounting the turbine and rampart device to a base structure such that the turbine is configured to rotate relative to the base structure in response to fluid flow. Implementations can include any, all, or none of the following features. At least a portion of the front region of the rampart device may extend to a vertical height greater than an uppermost portion of the turbine when positioned for use. The uppermost portion of the turbine may be a ridge of a fin. The upwardly protruding fins of the turbine may extend to a vertical height greater than an uppermost region of the upper surface.

In some embodiments, a turbine for use in an electrical generation system is provided, including a turbine that rotates about a vertical axis in response to fluid flowing toward the turbine in a flow direction that is generally perpendicular to the vertical axis, the turbine including a central upper surface and a plurality of upwardly protruding fins extending from an outer region proximate an outer periphery of the vertical-axis turbine, the upper surface and fins forming a continuously solid upward facing surface, and the upwardly protruding fins extend to a height greater than an uppermost portion of the central upper surface. Implementations can include any, all, or none of the following features. The upper surface and upwardly protruding fins may be an integrally formed, unitary structure. The fins may be fixedly positioned relative to the upper surface. Each fin may include opposite convex and concave surfaces, and both of the convex and concave surfaces may be upwardly facing surfaces. The upper surface may include a convex surface. The turbine may further include a base structure positioned below the turbine and have one or more anchor legs extending away from the vertical-axis turbine. The turbine may further include a rampart device positioned at least partially under the vertical-axis turbine and configured to remain generally stationary during rotation of the vertical-axis turbine. These and other embodiments described herein may provide one or more of the following benefits. First, some embodiments of an exemplary turbine system can include a turbine that employs a synergistic combination of fluid dynamics principals to harness kinetic energy in moving water or other fluid for conversion into mechanical rotary motion. Such mechanical rotary motion can be used, for example, to drive a rotor shaft of a permanent magnet generator (e.g., housed in an interior space of the turbine, an interior space of the rampart, our another housing configured to receive rotational mechanical energy from the turbine movement) for purposes of generating electrical power, or alternatively, to drive a pump system that urges hydraulic fluid through a remotely located (e.g. onshore) electric generator machine.

Second, the turbine system can employ a turbine and rampart device having novel configurations that harness kinetic energy of flowing water from both Newtonian forces acting upon multiple fins and from a pressure recovery effect induced in part by a shape of the rampart device, a convex dome of the turbine, a plurality of fins of the turbine, other structural features, or a combination thereof. For example, the contours of the rampart device and turbine may control and maintain laminar flow over the body of the turbine to promote such a pressure recovery effect, and the multiple fins at both upstream and downstream portions of the turbine may harness and redirect fluid flow while producing mechanical rotary motion.

Third, a turbine system including a rampart device can promote desirable flow proximate the turbine to enhance the capture of kinetic energy while providing physical protection to the rotating turbine. For example, a rampart device may promote consistent and predictable turbine performance even in a variety of flow conditions.

Fourth, the turbine system can be configured for use in flow conditions including slow-moving fluid flow and relatively shall water depths (e.g. less than the diameter of the turbine). For example, the turbine and rampart device may be configured to have a relatively large diameter and/or length while maintaining a relatively low profile such that the turbine can be partially or completely submerged in shallow water. Furthermore, the turbine and rampart device can be configured to have a relatively small body to enhance portability while providing electrical power.

Fifth, the turbine system can be constructed such that the turbine rotates in a consistent rotational direction about a vertical axis, for example, both when exposed to fluid flow approaching from a first flow direction that is generally perpendicular to the vertical axis and when exposed to a second flow direction that is opposite to the first flow direction. In such embodiments, the turbine system can be advantageously submerged along the floor of an ocean or body of water subject to tidal currents. For example, some embodiments of the turbine system can be configured to produce mechanical rotary motion in one direction about the vertical axis (for purposes of generating electrical power) both when exposed to the tidal currents during high tide and when exposed to the tidal currents during low tide. Further, in some embodiments, the rampart device does not rotate with the turbine, and instead may be configured to remain in a rigidly fixed position or to otherwise pivot relative to a base such that a front or leading surface of the rampart device remains directed into the flow of fluid. In such circumstances, the turbine system thus is not required to employ multiple turbine blade structures that rotate in opposite directions in order to harness energy from fluid flow in varying directions.

Sixth, the turbine system can be constructed from a relatively few number of components that reduces the number of moving parts and/or pinch points. For example, the turbine can be constructed as a unitary structure such that all of the fins and upper convex surface are integrally formed as a single-piece structure, which can provide a relatively low-maintenance structure that may be particularly beneficial for ocean and river applications in which the turbine system is fully submerged. In certain embodiments, the turbine can be formed as a unitary structure as part of a molding process that collectively forms the main body of the turbine including an upper convex surface and the fins. Such a molding process may be useful in forming a turbine in which the entire upper face, including an upper convex surface, the plurality of upwardly protruding fins, and the channel base surfaces between neighboring fins, for example, is free of apertures or other openings. In some embodiments, the turbine has a continuously upward facing surface that extends to a circular border at the outer periphery of the turbine. The rampart device may be similarly formed and readily receive the turbine and one or more other components. Accordingly, the turbine system can be efficiently and reproducibly manufactured in a low cost manner with relatively few components and associated assembly time.

Seventh, the turbine system can be readily installed in an existing stream, river, ocean, channel or other fluid flow with little or no additional infrastructure and little or no modification to the existing fluid flow. That is, an exemplary turbine system can be constructed and readily installed in a desired location with relatively little need for customization or additional engineering. In some embodiments, ready installation may be facilitated by a base structure that can serve as an anchor while also providing habitat for fish and marine life.

Eighth, the rampart device provides a generally stationary component (relative to the rotation turbine and the flowing fluid) that may house one or more components of the turbine system proximate the turbine. For example, rampart device may provide a housing for a permanent magnet generator, gear system, pump system component, or other component of the turbine system, while also being shaped to advantageously direct fluid flow and protect the turbine.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
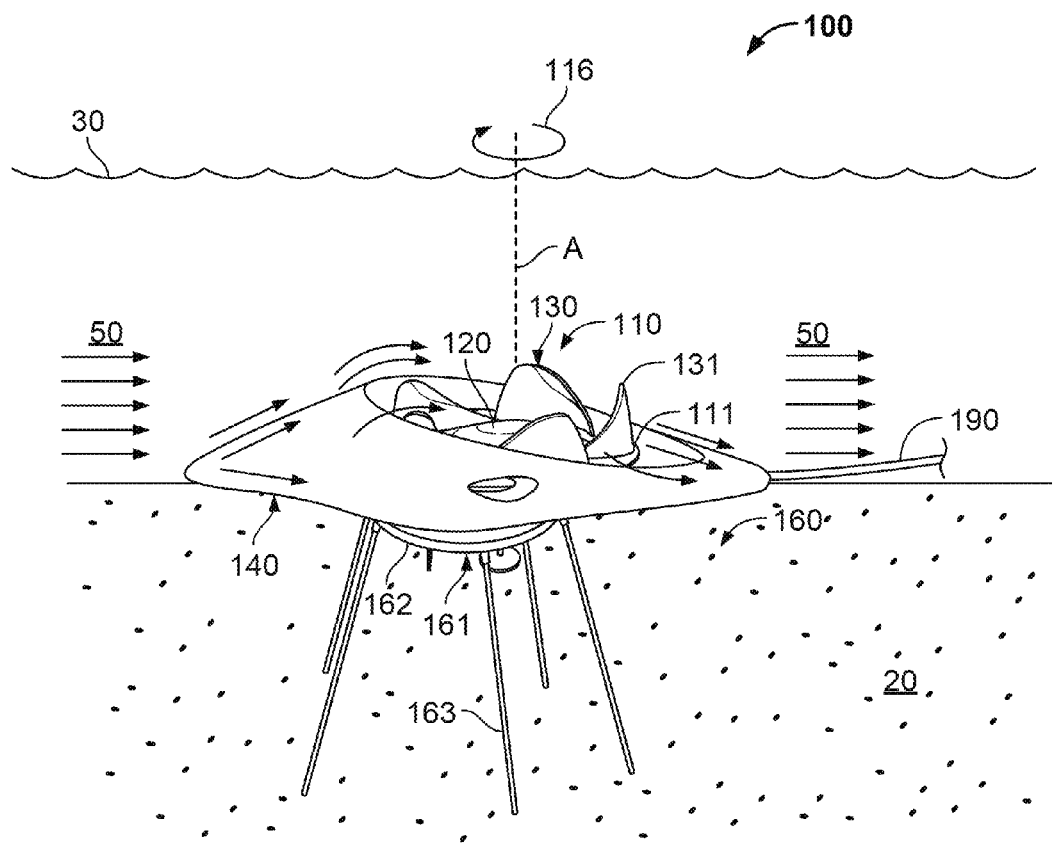
FIG. 1 is a perspective view of a turbine system submerged in a flowing fluid, in accordance with some exemplary embodiments.
Figure 2:
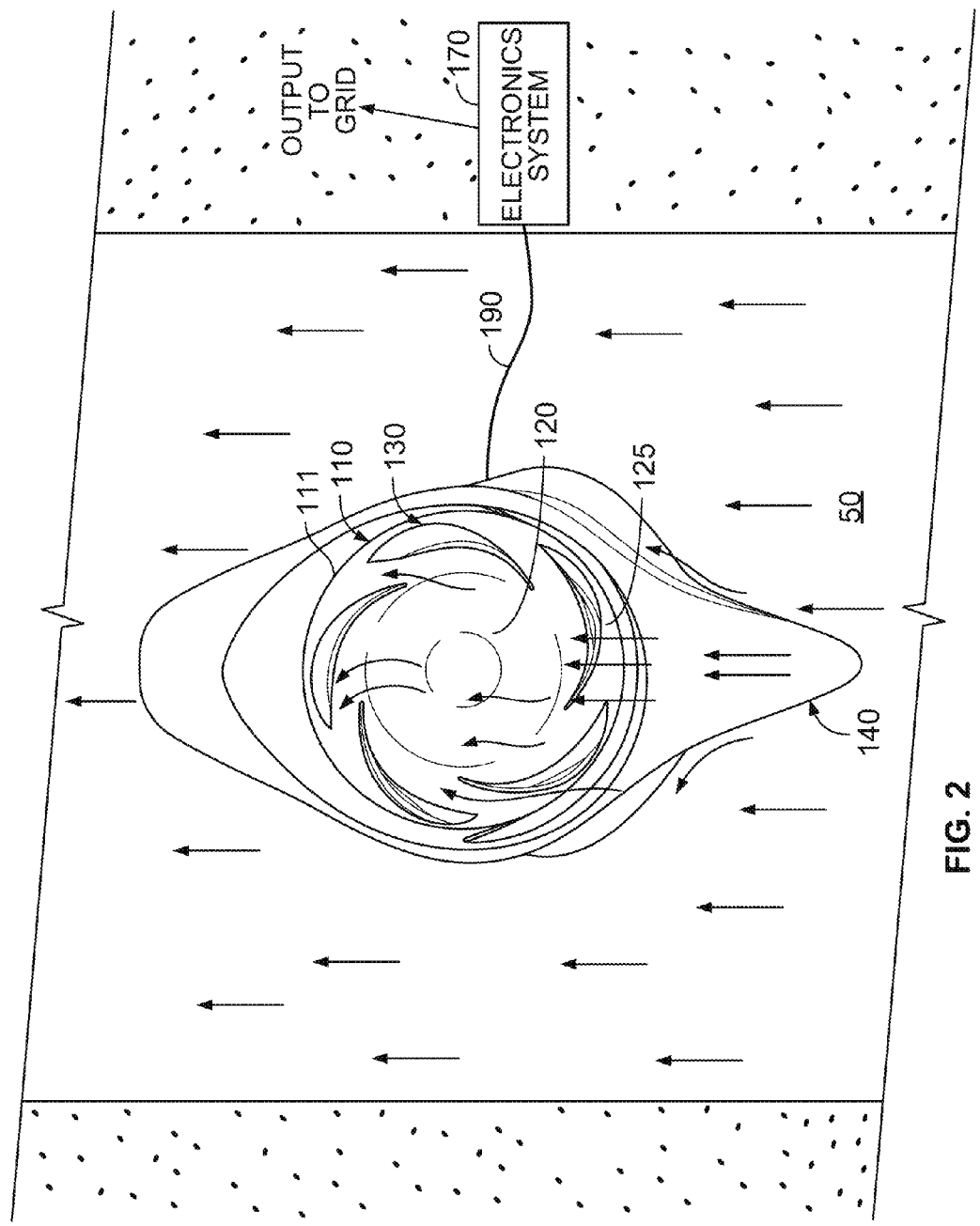
FIG. 2 is a top view of the turbine system of FIG. 1.

Referring to FIGS. 1-2, some embodiments of an exemplary turbine system 100 can include a turbine 110 and rampart device 140. Turbine 110 may be configured to rotate about an axis A in response to off-axis fluid flow 50 approaching the turbine 110 from a direction that is generally perpendicular to the axis A. In some embodiments, turbine system 100 includes a vertical-axis turbine 110 (e.g., such that the axis A is arranged in a substantially vertical orientation relative to a horizontal fluid flow) that generates mechanical rotary motion 116 to produce electrical power in response to water flowing in a river, stream, ocean, sea or other body of water having currents or flow. Rampart device 140 can serve as a shield apparatus that directs fluid flow proximate turbine 110 and in some embodiments may include a space that turbine 110 may rotate within and/or above. Preferably, turbine 110 and rampart device 140 are shaped and oriented to provide enhanced efficiency for electrical power generation under a variety of flow conditions, as described further herein.

Turbine system 100 can optionally include a base structure 160 positioned below turbine 110, rampart device 140, or both. For example, base structure 160 may include an anchor system 161 secured to a floor 20 (e.g., a river bed or other ground) below the surface 30 of the body of water in which turbine 110 and rampart device 140 are submerged. As such, base structure 160 is configured to remain generally stationary during rotation of turbine 110. In an exemplary embodiment, base structure 160 includes a pedestal structure 162 having one or more anchors 163 driven into floor 20 to anchor the position of turbine 110 and rampart device 140. Anchors 163 may include one or more legs having a longitudinal length greater than a height of turbine 110. Such a length may facilitate stability in a variety of fluid flow and floor conditions. In various exemplary embodiments, rampart device 140 may be mounted in spaced relation with pedestal structure 162, and/or pedestal structure 162 may be spaced from floor 20, such that one or more passages may be present through which fluid flow 50 may pass below turbine 110 and rampart device 140. Such passages may result in areas of slower fluid flow promoting marine life habitation, and/or may provide space for rampart device 140 to rotate and/or articulate, as described in greater detail herein.

One or more lines 190, such as an electrical cable line or a pipe line, may extend from base structure 160, rampart device 140 and/or turbine 110 toward a non-submerged electronics system 170 (FIG. 2). Line 190 may output electrical current generated from a permanent magnet generator (described in more detail below) coupled to the base structure 160 to the non-submerged electronics system 170. In this exemplary embodiment, electronics system 170 is positioned at an onshore location. Alternatively or in addition, electronics system 170 may be partially or fully located on an above-surface platform constructed over surface 30 of the water. Electronics system 170 can include an inverter and transmission system that is configured to condition the electrical power from line 190 for output to an external grid system. For example, electronics system 170 can be configured to output the electrical power as three-phase 120V AC power that is transmitted to the external power grid. In some alternative embodiments, electronics system 170 may house the electric generator (such that there is no generator coupled to the base structure 160 under the surface 30) so as to provide simplified maintenance. In those circumstances, line 190 can be configured to provide a pressurized fluid path (e.g., for hydraulic fluid) that is pumped to the electronics system 170 by the power of the mechanical rotary motion 116 of the turbine 110. From there, the hydraulic fluid can drive a rotor of the electric generator (housed by the electronics system 170) to rotate and thereby generate electric power. In any of these scenarios, turbine 110 can be used to generate the mechanical rotary motion 116 sufficient to produce electrical power even when submerged in relatively slow moving water current.

Still referring to FIGS. 1-2, turbine 110 and rampart device 140 include features configured to promote efficient harnessing of kinetic energy from fluid flow 50. For example, turbine 110 includes a central upper surface 120 and a plurality of upwardly protruding fins 130. Upper surface 120 may be partially defined by a bell-shaped or conical curve such that upper surface 120 has a generally dome or convex shape. In other optional embodiments, upper surface 120 may include a flat or concave shape. Each of fins 130 extends upwardly from an outer region of upper surface 120 of turbine 110, for example at or near an outer periphery 111 of turbine 110. In operation, fluid flow 50 may advance over rampart device 140 to turbine 110. As described in more detail herein, fluid flow 50 may be directed as it contacts and passes by one or more of upper surface 120, channels 125 and/or fins 130 such that kinetic energy of fluid flow 50 is harnessed to result in mechanical rotary motion 116 of turbine 110, as described in greater detail herein.

As shown in FIGS. 1-2, the plurality of fins 130 are arranged such that turbine 110 is urged to rotate in the rotational direction 116 about vertical axis A in response to fluid flow 50 traveling in a first flow direction that is generally perpendicular to vertical axis A (e.g. flowing from left to right as shown in FIG. 1 and from bottom to top as shown in FIG. 2). However, it should be understood from the description herein that the arrangement of fins 130 likewise causes turbine 110 to rotate in the same rotational direction 116 in response to fluid flow 10 traveling in a second opposite flow direction that is also generally perpendicular to vertical axis A. In other words, turbine 110 would be urged to rotate in the same rotational direction 116 even if fluid flow 10 were traveling opposite to that depicted in FIGS. 1-2 (e.g., if fluid flow 10 were flowing from right to left in FIG. 1 and from top to bottom in FIG. 2). Thus, fins 130 are arranged such that turbine 110 rotates in rotational direction 116 about vertical axis A both in response to fluid flowing over turbine 110 in a first flow direction that is generally perpendicular to the vertical axis and in response to fluid flowing over turbine 110 in a second opposite flow direction that is generally perpendicular to the vertical axis.

Rampart device 140 may supported, directly or indirectly, by base structure 160 such that rampart device 140 remains generally stationary relative to the rotating turbine 110 (e.g., the rampart device 140 does not rotate with the turbine 110 and is either completely fixed or configured to pivot relative to the base structure 160 or floor 20 under particular conditions). In an exemplary embodiment, rampart device 140 may be completely fixed relative to base structure 160. In other exemplary embodiments, rampart device 140 may be able to pivot relative to base structure 160. For example, rampart device 140 may be able to pivot 180 degrees or more about axis A such that rampart device 140 may have a desired orientation relative to a changing fluid flow. For example, rampart device 140 may pivot about vertical axis A to be oriented in a first direction for a high tide current and a second direction for a low tide current. Alternatively or in addition, rampart device 140 may be able to pivot about another (horizontal) axis such that rampart device 140 has a selected angular orientation relative to incoming fluid flow 50 (e.g., the leading nose of the rampart device 140 is tilted relative to the horizontal plane of the fluid flow, for example, to shift the overall orientation of combined assembly of the rampart device and turbine 110 to a tilted orientation by about +/−15-degrees). For example, rampart device 140 may be able to articulate, manually and/or by the force of fluid flow 50, such that an angle of rampart device 140 may be varied based on the speed, turbulence, or other characteristic of fluid flow 50.

Figure 3:
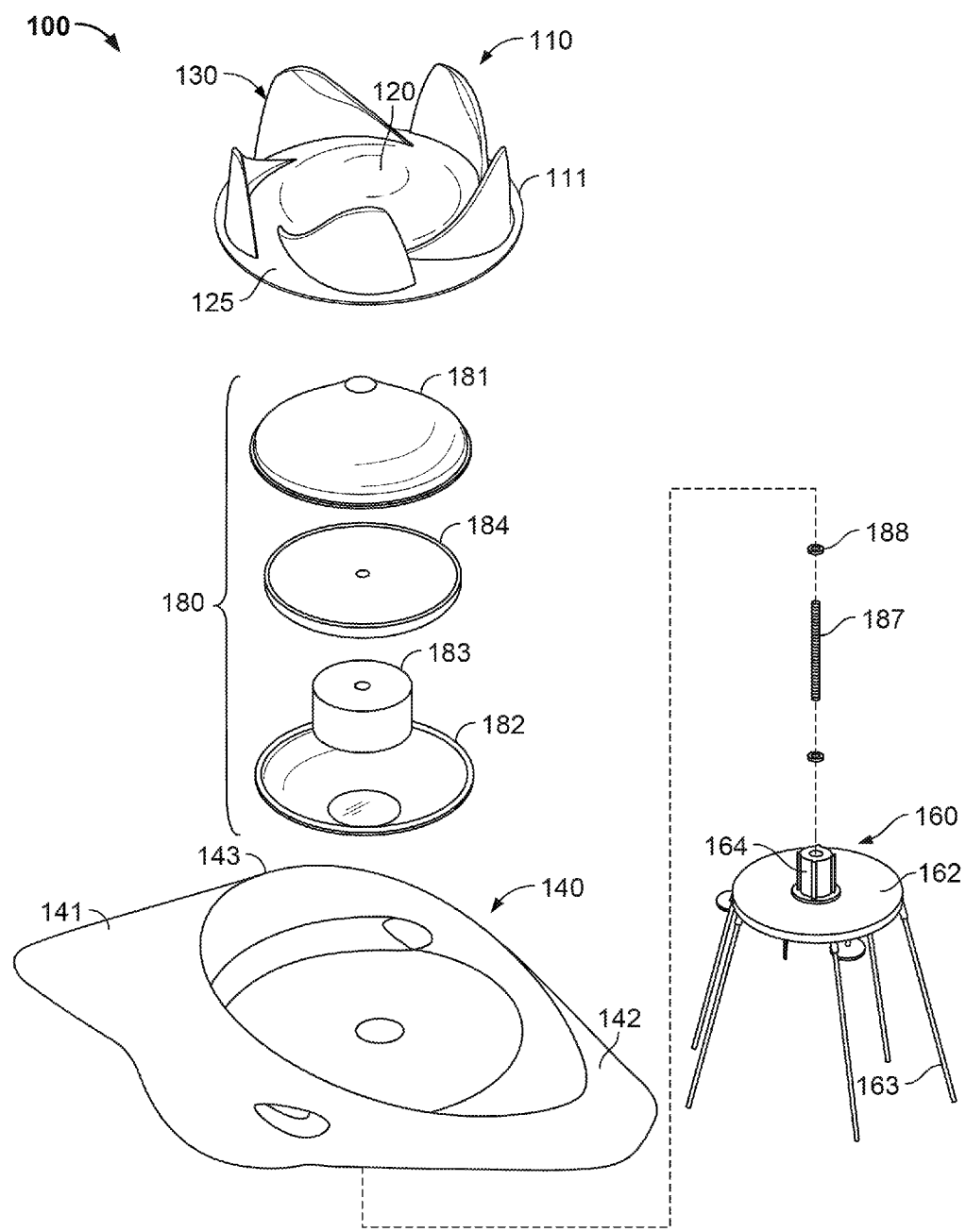
FIG. 3 is a perspective exploded view of particular components of the turbine system of FIG. 1.

Referring now to FIG. 3, some embodiments of turbine system 100 can be constructed such that one or more components may be positioned between or within turbine 110, rampart device 140, base structure 160, or a combination thereof. For example, turbine system 100 may include a sealing housing 180 including components that facilitate the conversion of mechanical rotary motion 116 (FIGS. 1-2) of the turbine 110 into electrical power. Sealed housing 180 can be mounted so as to utilize interior space between or within turbine 110, rampart device 140 and/or base structure 160. In some cases, such a configuration facilitates a relatively low profile or vertical height of the turbine system 100 so that it can operate in a shallow depth of a body of water. In an exemplary embodiment, sealing housing 180 can include first and second shells 181, 182 that are sealed together to enclose one or more components, such as a permanent magnet generator 183 and a transmission or gear system 184. Transmission or gear system 184 may include a hydraulic transmission, planetary gear system or another arrangement that converts rotational motion 116 of turbine 110 (and/or a drive shaft 187 mounted thereto) into a higher rotational speed for the rotor of the permanent magnet generator 183. Permanent magnet generator 183 may include a rotor that rotates inside a stator (e.g., having conductive coils arranged in slots) so that the rotation of the rotor induces electrical current in the coils of the stator. This generated current can be output via line 190 (FIG. 2) to electronics system 170 onshore or on a platform. It should be understood that alternative embodiments of the permanent magnet generator 183, such as having differing internal components or a different size and shape, can be employed in turbine system 100.

In an exemplary embodiment, drive shaft 187 extends downwardly from a lower region of turbine 110 and/or rampart device 140 to a bearing member 164 of base structure 160. One or more seals 188 may be included proximate drive shaft 187, for example at apertures of first and second shells 181, 182, to provide a watertight seal along the portion of the drive shaft 187 that passes through sealed housing 180.

In various embodiments, sealed housing 180 may include components of a pump system, alternatively or in addition to permanent magnet generator 183. For example, in some embodiments, non-submerged electronics system 170 (FIGS. 1-2) may house the electric generator (such that there is no generator coupled to base structure 160) so as to provide convenient access to the generator for maintenance or repair purposes. In such circumstances, structure inside sealed housing 180 can include a pump system that forces hydraulic fluid through a pipeline (e.g. such as line 190 in FIG. 2) to the electronics system 170 by the power of the mechanical rotary motion 116 of the turbine 110. From there, the hydraulic fluid can drive a rotor of the electric generator (housed by the electronics system 170) to rotate and thereby generate electric power.

In various exemplary embodiments, one or more components of turbine system may be housed in an interior region of rampart device 140 instead of or in addition to being within turbine 110 and/or housing 180. For example, rampart device 140 may include one or more interior volumes, for example within a front region 141, a tail region 142, a turbine-receiving region 143 and/or other regions of rampart device 140 where various components of turbine system 100 may be positioned.

Referring to FIGS. 4-9, the shape and configuration of turbine 110 and rampart device 140 contribute to a synergistic combination of Newtonian forces and a pressure recovery effect to drive the rotary motion 116 of turbine 110. Rampart device 140 may be configured to advantageously direct fluid flow upstream of turbine 110. Turbine 110 includes features to promote efficient harnessing of kinetic energy of a fluid acting on turbine 110.

Figure 4:
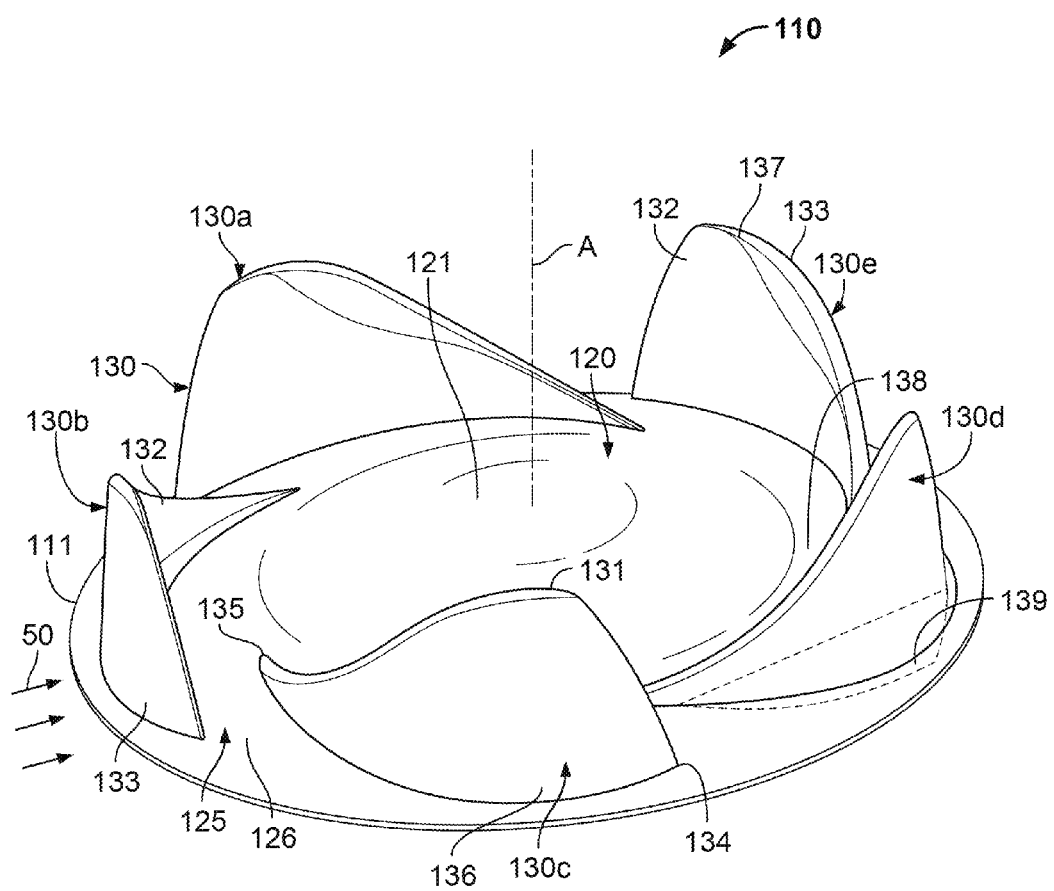
FIG. 4 is a perspective view of a turbine for use with a turbine system such as the system of FIG. 1, in accordance with some exemplary embodiments.
Figure 5:
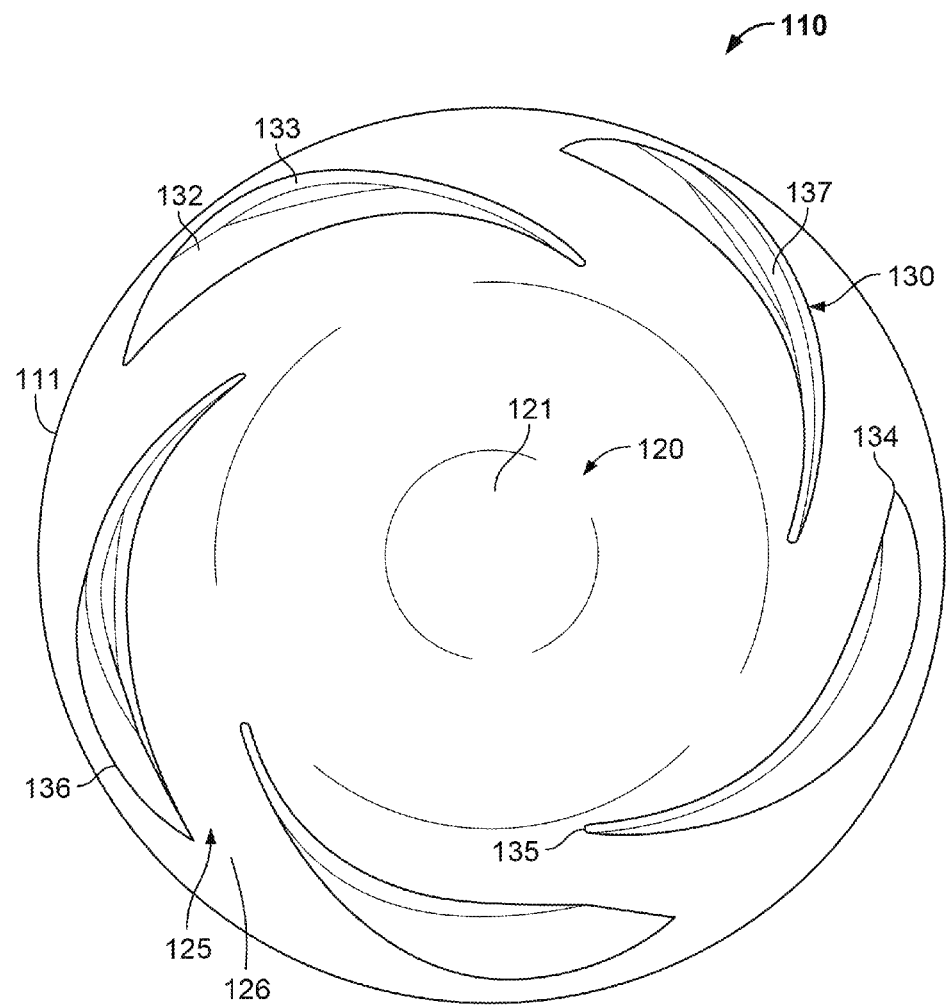
FIG. 5 is a top plan view of the turbine of FIG. 4.
Figure 6:
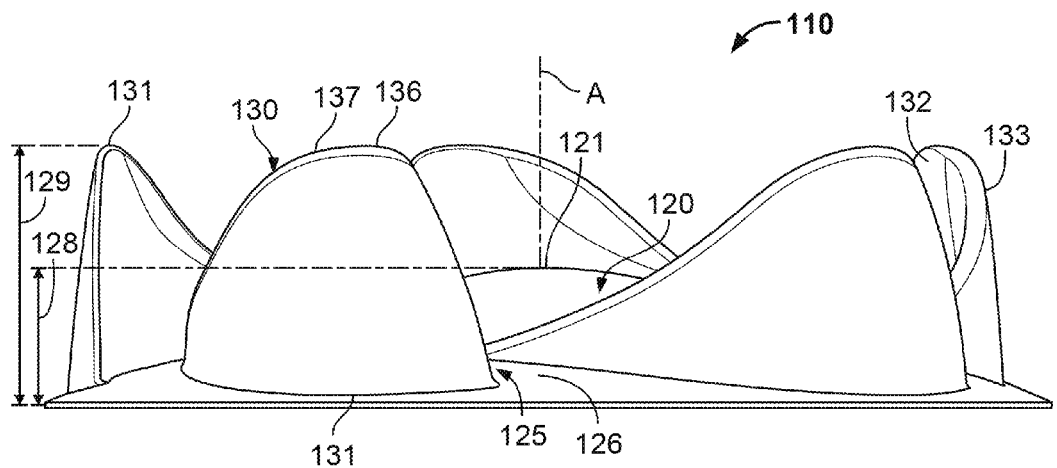
FIG. 6 is a side elevation view of the turbine of FIG. 4.

FIGS. 4-6 show an exemplary turbine 110 including centrally located upper surface 120, a plurality of upwardly protruding fins 130, and channels 125 defined between channel base surfaces 126 and neighboring fins 130. In this embodiment, turbine 110 includes five fins 130a-e that protrude upwardly to a vertical height greater than the outer periphery of turbine 110. When the fins 130a-e rotate to different positions about vertical axis A, each fin 130a-e is configured to capture fluid flowing over the upper face of turbine 110, redirecting the fluid flow along a path different from the ambient fluid flow. For example, fins 130a-e induce a high pressure region 138 formed in a channel on a first side, such as a concave side 132, of a respective fine at a downstream portion, and a low pressure region is formed on a second opposite side, such as a convex side 133, of the respective fin.

Turbine 110 in this embodiment has an upper face including centrally located upper surface 120, the plurality of upwardly protruding fins 130, and the channel base surfaces 126. Accordingly, in this embodiment, the entire upper face of turbine 110 is free of apertures or other openings such that turbine 110 has a continuously solid upward facing surface that extends to a circular border at the outer periphery 111 of turbine 110. For example, each fin 130a-e is continuously upward facing such that the fin does not curve back over itself or otherwise include a downward facing surface.

Turbine 110 may be sized to harness kinetic energy in a variety of environments. In an exemplary embodiment, the outer periphery 111 of turbine 110 may have a diameter of between about 3 feet and 24 feet, 5 feet and 20 feet, 7 feet to 15 feet, or about 8 feet. In various river or stream applications, turbine 110 may have a diameter of about 8 feet, and in various ocean applications, may have a diameter of about 12 feet, for example. In some exemplary embodiments, turbine 110 may be sized for portability or simplified transportation in a backpack for remote power generation for recreational or military use. For example, an exemplary turbine 110 may have a diameter of about 4 inches to 24 inches, 8 inches to 16, or about 6 inches. Such a diameter of turbine 110 facilitates use as a portable power generator for temporary use in a river or stream (e.g. to provide electrical power for communication equipment or other gear).

In the embodiment shown in FIGS. 4-6, each of fins 130a-e is positioned radially inward of a circular border at outer periphery 111, and each of fins 130a-e protrudes upwardly to a vertical height above outer periphery 111. Each of fins 130a-e may have a substantially identical shape and size, and may include an inner concave face 132 and an oppositely disposed convex face 133. In an exemplary embodiment, both of the entire concave face 132 and convex face 133 are upwardly facing surfaces so that, for example, the respective fin 130a-e does not curl over to provide a downward facing fin portion. Fins 130 are relatively thin between the concave and convex faces 132, 133, and relatively wide between terminal ends 134, 135 of each fin 130. Oppositely disposed faces 132, 133 intersect at a curved ridge 137 that defines an upper edge of each fin 130. In operation, convex face 133 exhibits a hydrofoil shape that reduces drag as water flows over convex face 133, while concave face 132 is configured to capture and redirect fluid flow 50. Accordingly, fins 130a-e are arranged such that turbine 110 rotates in rotational direction 116 (FIGS. 1-2) about the vertical axis A both in response to fluid flowing over turbine 110 in a first flow direction that is generally perpendicular to vertical axis A and in response to fluid flowing over the turbine in a second opposite flow direction that is also generally perpendicular to vertical axis A.

In an exemplary embodiment, fins 130 are configured to have a relatively large width between ends 134, 135, and a relatively large height between a surface of turbine 110 and an upper curved ridge 137. Accordingly, a surface area of each fin, and particularly an area of inner concave surface 132, is relatively large. A relatively large concave surface 132 increases the surface in contact with flowing water and generally increases the volume of water redirected by fins 130 and from which energy can be harnessed. Furthermore, concave surface 132 may be substantially vertical, enhancing the force of water flow 50 acting on fins 130 and resulting in rotational motion 116 of turbine 110. In various exemplary embodiments, fins 130 may have a height between upper surface 120 and uppermost portion 131 of fin 130 parallel to vertical axis A having a desired relationship with a diameter of turbine 110. In various exemplary embodiments, a height of each of fins 130a-e is between about 10% and 100%, 20% and 50%, or about 30% of the diameter of turbine 110. Such heights in relation to a diameter of turbine 110 allow fluid flow 50 to be efficiently harnessed and translated to rotational motion of turbine 110.

Similarly, a length of fins 130 between first and second ends 134, 135 may be related to a size of turbine 110 and a number of fins 130. For example, in some embodiments, a sum of the length of all of fins 130 may be greater than a circumference of turbine 110 at outer periphery 111 and fins 130 may at least partially overlap. In an embodiment in which turbine 110 has five fins 130, a length of each fin may be between approximately 5% and 50%, 10% and 30%, or about 20% of the circumference of turbine 110 at outer periphery 111.

In various exemplary embodiments, fins 130 may be positioned relative to vertical axis A and outer periphery 111 of turbine 110 to promote efficient capture of kinetic energy from fluid flow 50. For example, ends 134, 135 of each fin 130 may be positioned relatively close to outer periphery 111 such that fins have a generally open configuration. For example, in various exemplary embodiments, a radial distance between outer periphery 111 and first and second ends 134 and 135 is between about 2% and 80%, 10% and 50%, 20% and 40%, or less than about 30% the radius of turbine 110. A significant area of concave surfaces 132 may thus encounter fluid flow 50 flowing across turbine 110, and a significant portion of fluid flow 50 may flow in a direction generally perpendicularly toward concave face 132 of respective fins 130 when each fin is in a downstream position (e.g. fin 130e in FIG. 4). That is, in some exemplary embodiments, a relatively large or maximum area of concave face 132 is facing towards an incoming fluid flow 50 when a fin 130 is in a downstream position due to the open positioning of the fin 130. Likewise, a relatively smaller area of concave face 132 may be open towards incoming fluid flow when in a middle or upstream position (e.g. fins 130c, 130d in FIG. 4). In some embodiments, respective ends 134 and 135 of neighboring fins 130 may overlap such that fluid cannot flow in a straight line across turbine 110 without encountering a concave face 132 of a fin 130 or otherwise being redirected to channels 125. Fins 130 having such shapes and positioning enhance the kinetic energy that may be harnessed by turbine 110 without creating excessive drag or resistance against rotation of turbine 110.

As shown in FIGS. 4-5, fins 130a-e are positioned to be non-symmetric about vertical axis A. For example, in this embodiment, fins 130 include five fins 130a-e that are curved along a length between first and second ends 134, 135, and thus are positioned non-symmetrically about the vertical axis A. In some embodiments, fins 130a-e are oriented such that respective first ends 134 may be slightly closer to outer periphery 111 as compared to second ends 135. In an exemplary embodiment, fins 130a-e have a respective outermost location 136 nearest outer periphery 111, and the outer most portion 136 is between first and second ends 134, 135 such that first and second ends 134, 135 are closer to vertical axis A than outermost portion 136. In alternative exemplary embodiments, turbine 110 may comprise fins 130 that are symmetrically positioned about vertical axis A. For example, turbine 110 may include four fins 130 that are positioned symmetrically about vertical axis A.

Still referring to FIGS. 4-6, centrally located upper surface 120 is symmetric about vertical axis A. Upper surface 120 may be partially defined by a bell-shaped or conical curve such that upper surface 120 has a generally dome or convex shape that guides fluid flow. In particular embodiments, the contour of the upper surface 120 may serve as a "base shape" that is interrupted by fins 130 that protrude upwardly from the base shape, and provides smooth transitions between a surface near the uppermost portion 121 of the upper surface 120 and channel base surfaces 126 between respective fins 130. First and second ends 134, 135 of respective fins 130 are below uppermost portion 121 of upper surface 120. In various exemplary embodiments, such a relationship between fins 130 and upper surface 120 may reduce drag as fluid is able to flow over upper surface 120 without interference of fins 130, until the fluid flow is directed to advantageously contact concave surfaces 132 of fins 130 such that kinetic energy may be harvested. The curved contour of turbine 110 may further facilitate capture of energy from fluid flow 50 by enhancing the pressure recovery effect that enables turbine 110 to capture kinetic energy from direction changes of fluid flow 50 more than once as fluid flows across turbine 110.

A relative height of fins 130 and uppermost portion 121 of upper surface 120 may be selected to enhance fluid flow over turbine 110. In an exemplary embodiment, an uppermost portion 131 of each respective fin 130 has a vertical height 129 that is greater than a vertical height 128 of uppermost portion 121 of upper surface 120. Such a relationship may promote controlled flow over upper surface 120 while enhancing the fluid flow that may be harnessed and redirected by fins 130, for example, when the turbine 110 rotates adjacent to the rampart device 140. In some exemplary embodiments, uppermost portion 131 of fins 130 may be the structure having the greatest vertical height of turbine 110 and rampart device 140 (e.g., as measured from the base structure 160, the floor 20, or a lowermost end of the turbine 110). For example, uppermost portion 131 of fins 130 may have a vertical height greater than uppermost portion 146 of rampart device 140. Alternatively, fins 130 may have a vertical height that is greater than uppermost portion 121 of upper surface 120 but less than an uppermost portion 146 of rampart device 140, as described further herein. In other optional embodiments, uppermost portion 121 of upper surface 120 may have a vertical height greater than that of uppermost portion 131 of each of fins 130.

Figure 7:
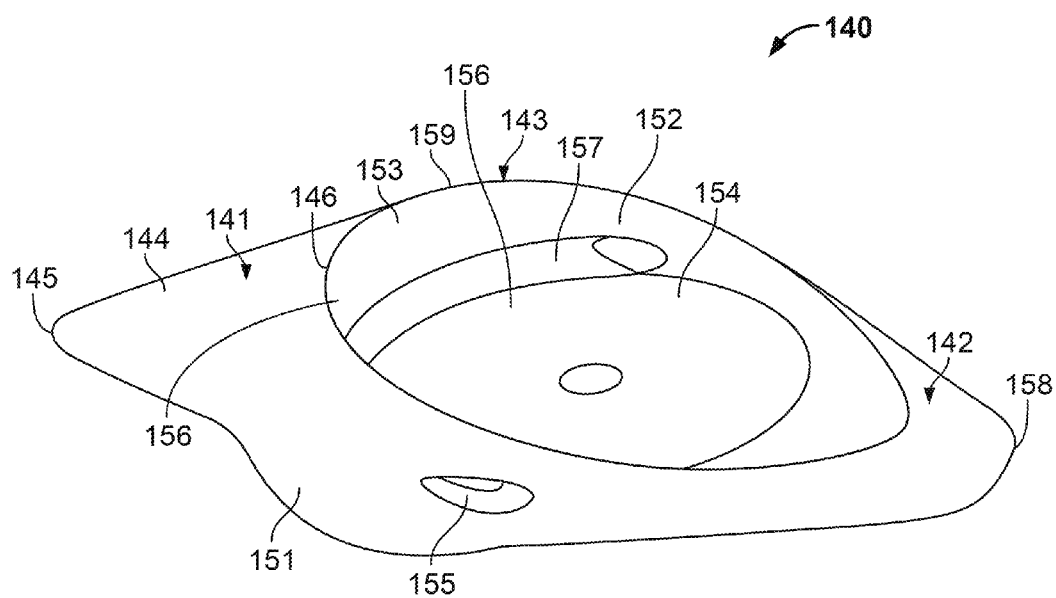
FIG. 7 is a perspective view of rampart device for use with a turbine system such as the system of FIG. 1, in accordance with some exemplary embodiments.
Figure 8:
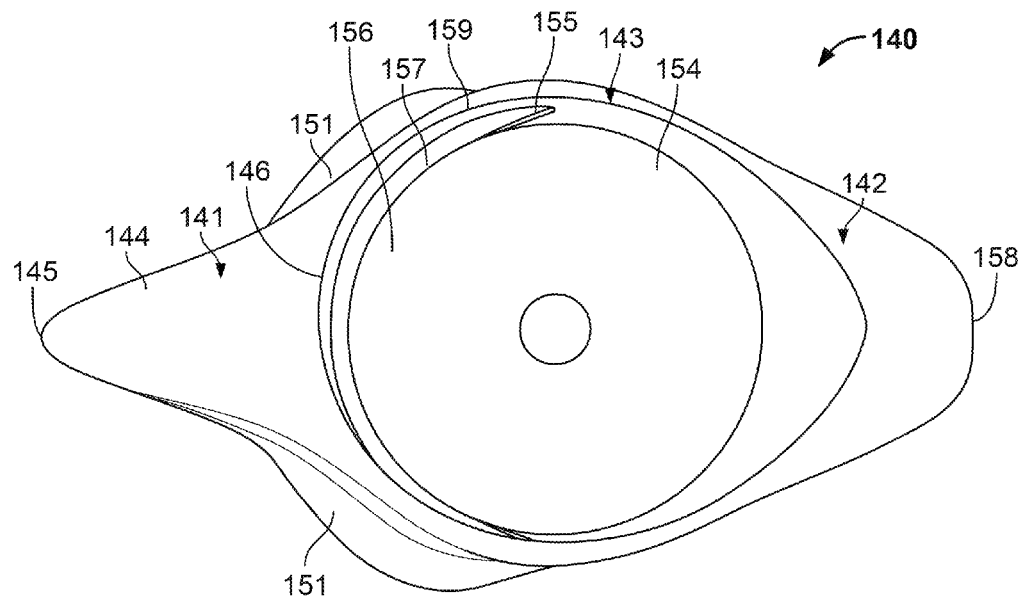
FIG. 8 is a top plan view of the rampart device of FIG. 7.
Figure 9:
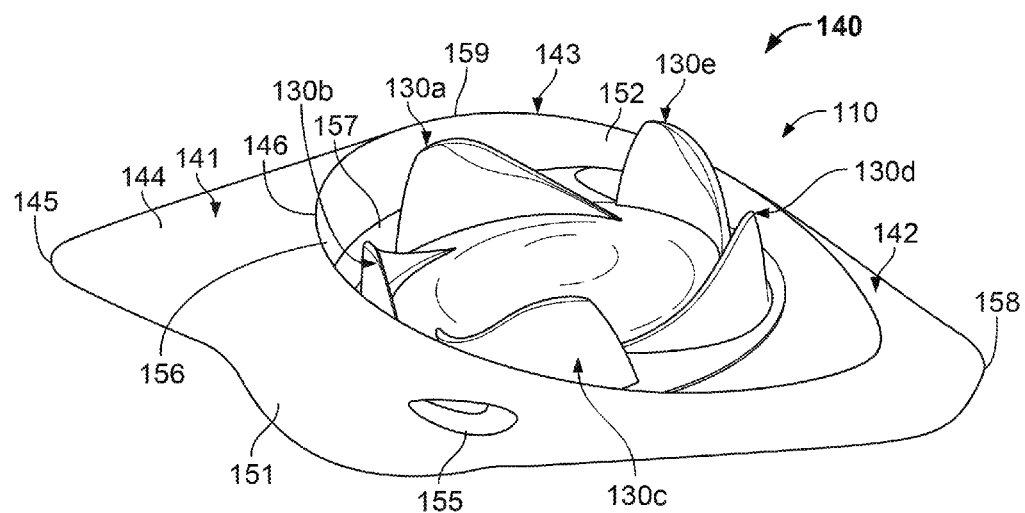
FIG. 9 is a perspective view of an exemplary embodiment of a turbine and rampart device.

Referring now to FIGS. 7-9, an exemplary rampart device 140 is shown. In various exemplary embodiments, rampart device 140 is positioned proximate turbine 110 to control and direct fluid flow and/or to provide support and protection to turbine 110, and in some embodiments may be positioned at least partially under turbine 110. In an exemplary embodiment, rampart device 140 includes a body having a front region 141, tail region 142, and a turbine-receiving region 143 positioned generally between the front and tail regions 141, 142. Turbine 110 may be rotatably positioned proximate turbine-receiving region 143 such that turbine 110 may rotate in a flow of fluid while rampart device 140 remains relatively stationary. In the depicted embodiment, rampart device 140 is thus asymmetric about vertical axis A, and front region 141 and tail region 142 have differing shapes to affect fluid upstream and downstream, respectively, of turbine 110.

The shape of rampart device 140 may be configured to direct and control fluid such that fluid flow 50 may advantageously contact fins 130 of turbine 110. In an exemplary embodiment, front region 141 of rampart device 140 includes an elongate sloping surface 144 extending at least between a leading edge 145 and an uppermost portion 146 positioned rearwardly of leading edge 145. Front region 141 directs fluid flow upward over front region 141 to uppermost portion 146, as well as around each side of rampart device 140. Accordingly, in this embodiment, rampart device 140 splits fluid flow into fluid streams at least above and on each side of rampart device 140. Front region 141 may have generally curved and fluid dynamic surfaces that promote laminar flow, and fluid flow may be directed over front region 141 with little or no reduction in speed. As described further herein, laminar fluid flow proximate turbine 110 may enhance the ability of turbine 110 to efficiently harness kinetic energy while avoiding undue drag or resistance as turbine 110 rotates.

Rampart device 140 may include one or more lateral wing or flared regions 151 extending generally outwardly on each side of rampart device 140. Flared regions 151 may be configured to promote laminar fluid flow around each side of rampart device 140. In some exemplary embodiments, flared regions 151 have a generally convex upper surface and a substantially flat or concave lower surface. Incoming fluid flow 50 may be directed upwardly or "lifted" before reaching turbine 110 by flared regions 151, in conjunction with front region 141, for example. Fluid may thus rise proximate front region 141 and/or turbine-receiving region 143, which can enhance a "water fall" effect by producing a greater height for water to move downwardly through turbine 110. A buildup of fluid upstream of turbine 110, followed by collapse or downward flow of fluid through turbine 110, can contribute to power generation by capturing the weight of fluid as it falls or moves downwardly through turbine 110 in addition to the velocity of fluid flowing generally perpendicular to axis A. As described herein, fluid flow may collapse or fall a distance greater than 0.5 feet, 1 foot, 2 feet or greater than 3 feet between front region 141 and tail region 142 of rampart device 140.

Fluid flowing over the surface of flared regions 151 may also generate a slight downforce on rampart device 140, and in some embodiments flared regions may protect a floor proximate rampart device 140 from erosion that could result due to fluid flow around front region 141. In various exemplary embodiments, flared regions 151 may also facilitate a desired orientation of rampart device 140 by causing rampart device 140 to articulate relative to a base structure (e.g. FIG. 3) based in part on a speed of fluid flow, for example.

Rampart device 140 may further include a tail region 142 that extends generally downstream of front region 141 and/or turbine-receiving region 143. Tail region 142 includes one or more upwardly facing major surfaces, and in some embodiments, at least a portion of tail region 143 is positioned at a vertical height lower than outer periphery 111 of turbine 110 (FIG. 9). Tail region 143 may be configured to protect a floor below rampart device 140 from eddies or other flow that could result in erosion beneath and/or behind turbine 110 over time, and provides a length for fluid flow to normalize after passing over turbine 110. In some configurations, tail region may also reduce eddies and other swirling fluid flow that could create drag or resistance on turbine 110.

In an exemplary embodiment, rampart device 140 includes a turbine-receiving region 143 generally between front region 141 and tail region 142. Turbine-receiving region 143 of rampart device 140 includes one or more surfaces where turbine 110 may be positioned. In an exemplary embodiment, turbine-receiving region 143 includes a recess 152 that turbine 110 may be at least partially rotatably positioned within. Recess 152 is defined at least in part by a curved wall 153. Curved wall 153 may extend between an uppermost portion 146 and a base surface 154 of recess 152. In an exemplary embodiment, curved wall 153 has a maximum height at an upstream region of turbine-receiving region 143 near front region 141, for example at uppermost portion 146, and gradually tapers downward towards tail region 142. For example, an upper edge 159 of curved wall 153 may define a generally circular opening that is angled with respect to vertical axis A such that curved wall 153 extends to a greater vertical height near front region 141 than near tail region 142. In various exemplary embodiments, curved wall 152 may have a maximum height at uppermost portion 146 generally along a central longitudinal axis of rampart device 140. In other exemplary embodiments, a maximum height of curved wall 152 and/or uppermost portion 146 may be positioned offset from a central axis, to allow more direct fluid flow to turbine 110.

In an exemplary embodiment, upper edge 159 may be configured to reduce interference from debris and promote removal of debris that may land on turbine 110. For example, an upper edge 159 of curved wall 153 that is angled with respect to vertical axis A such that a height of curved wall tapers near tail region can facilitate removal of debris from turbine 110 and/or rampart 140. Large debris that may be positioned on turbine 110 is raised upwards by upper edge 159 with rotation of turbine 110, and may be freed such that the debris is carried away be fluid flow 50. Such a configuration may thus provide an ability of turbine system 100 to self-clean, further promoting reliability and reducing maintenance.

In an exemplary embodiment, turbine-receiving region 143 includes one or more apertures 155 extending through curved wall 153 between an interior of recess 152 and an exterior of rampart device 140. Apertures 155 allow fluid communication between recess 152 and an exterior of rampart device 140. For example, apertures 155 may be positioned generally centrally of turbine-receiving region 143 at a height approximately even with base surface 154 of recess 152, or lower edge of curved wall 153, and configured to allow fluid to exit from a leading portion 156 of recess 152. That is, fluid within leading portion 156 of recess 152 may exit through apertures 155 rather than flowing over or around turbine 110. In some exemplary embodiments, curved wall 153 may at least in part define a flow channel 157 that directs fluid in leading portion 156 between apertures 155. Flow channel 147 may thus allow for evacuation of fluid flowing off convex surface 133 of fins 130 as fins 130 rotate. In various exemplary embodiments, apertures 155 and/or flow channel 157 may reduce the presence of a high pressure dead zone of slow moving fluid proximate leading portion 156 that could be associated with drag or resistance against desirable rotation of turbine 110. In some configurations, the shape of rampart device 140 may promote a low pressure effect such that fluid flow along outer sides of rampart device 140 draws fluid from leading portion 156 of recess 152 and out through apertures 155.

Rampart device 140 may be sized to promote desirable fluid flow proximate turbine 110, and in some embodiments may be sized to have a particular dimensional relationship with turbine 110. In various exemplary embodiments, rampart device 140 may have an overall length between leading end 145 and a tail end 158 between about 6 feet and 48 feet, 12 feet and 24 feet, or about 20 feet. Front region 141 may have a length between approximately 2 feet and 24 feet, 4 feet and 16 feet, or about 6 feet, and tail region may have a length between approximately 2 feet and 24 feet, 3 feet and 8 feet, or about 4 feet. In various exemplary embodiments in which turbine 110 may be sized for portability or simplified transportation in a backpack for remote power generation, rampart device may have a length between leading end 145 and tail end 158 between about 6 inches and 24 inches, 8 inches and 16 inches, or about 12 inches. In various exemplary embodiments, turbine 110 and rampart device 140 are sized to have a particular dimensional relationship such that rampart device 140 has a length between leading end 145 and tail end 158 between approximately 120% and 400%, 150% and 300%, or about 250% of the diameter of turbine 110. For example, front region 141 may have a length be between approximately 20% and 300%, 50% and 200%, or about 70% the diameter of turbine 110, and tail region may have a length between approximately 20% and 300%, 30% and 100%, or about 50% of the diameter of turbine 110. Such dimensional relationships between turbine 110 and rampart device 140 allow fluid flow proximate turbine 110 and rampart device 140 to be advantageously controlled while resulting in a relatively compact turbine system 110 that can be positioned in a variety of environments and flow conditions.

In various exemplary embodiments, curved wall 153 of rampart device 140 extends to a height greater than at least a portion of turbine 110. For example, at least portions of rampart device 140 have a vertical height greater than outer periphery 111 of turbine 110 when positioned at turbine-receiving region 143. In some embodiments, at least portions of rampart device 140, such as uppermost portion 146, extend to a vertical height greater than uppermost portion 131 of fins 130 such that all of turbine 110 may be positionable below uppermost portion 146 of rampart device 140. That is, uppermost portion 146 may have a vertical height greater than an uppermost portion 131 of each of fins 130 when turbine system 100 is positioned for use. Such a relationship between turbine 110 and rampart device 140 provides protection to turbine 110 and directs fluid flow in advance of turbine 110. Fins 130 may be relatively protected from fluid flow 50 when in a position proximate front region 141 (e.g. fins 130a, 130b in FIG. 9) and relatively exposed to fluid flow 50 when in a position proximate tail region 142 (e.g. fins 130c, 130d, 130e in FIG. 9). Rampart 140 may thus promote harnessing of kinetic energy from fluid flow 50 by fins 130 while reducing drag or resistance on turbine 110 that could occur from fluid flow 50 acting on fins 130 traveling in an upstream direction.

Figure 10:
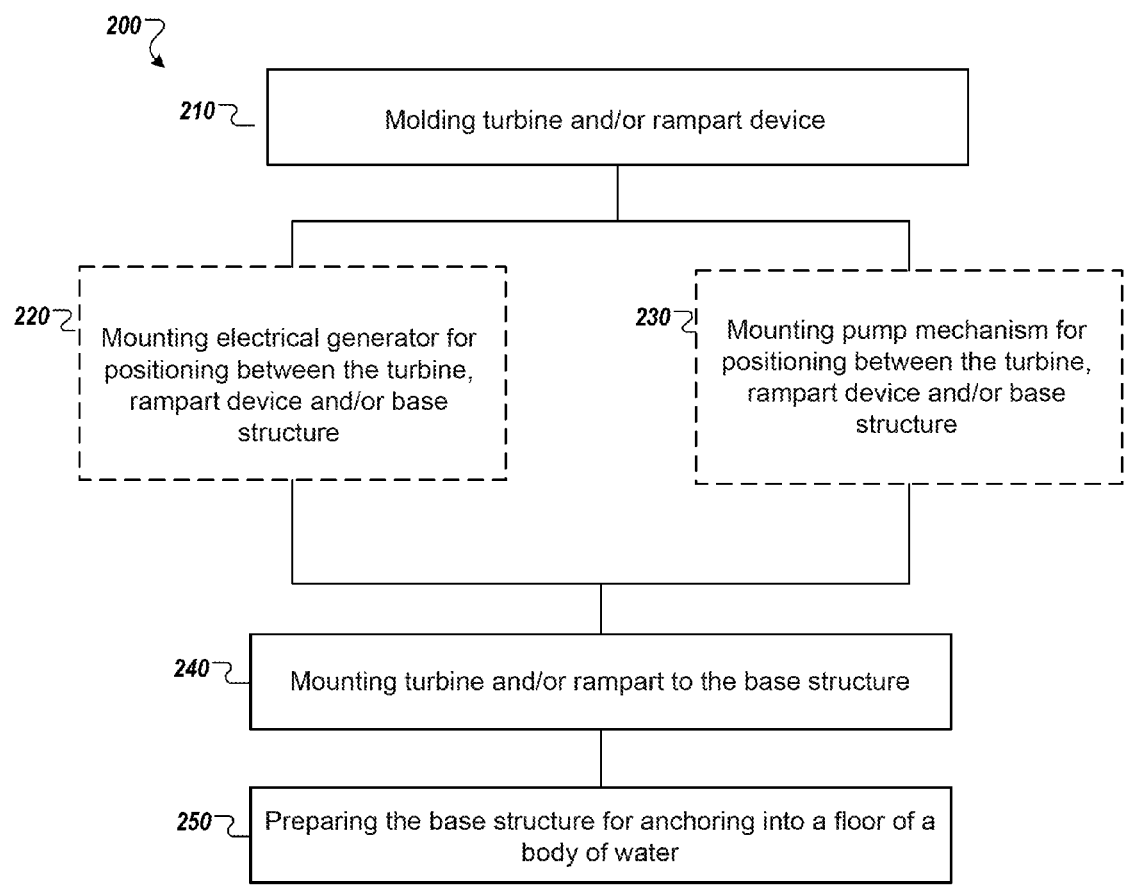
FIG. 10 is a flow chart for a process of manufacturing a turbine system such as the system of FIG. 1, in accordance with some embodiments.

Referring to FIG. 10, turbine system 100, including turbine 110 and rampart device 140, may be manufactured to have the features and characteristics described herein according to an exemplary method 200. For example, turbine 110 and/or rampart device 140 may be formed, at least in part, by a molding operation 210. In an exemplary embodiment, all components of turbine 110, including upper surface 120, fins 130a-e, base surfaces 126 between the fins, etc., may be molded as a unitary structure. That is, turbine 110 may be an integrally formed, unitary structure that includes upper surface 120, fins 130a-e, base surfaces 126, etc. In other optional embodiments, turbine 110 and/or rampart device 140 may be assembled from multiple components joined together. Turbine 110 and/or rampart device 140 may be made out of a durable and relatively lightweight material, such as a synthetic polymer including a polyamide, polyethylene terephthalate, fiber-reinforced polymer, carbon fiber, etc. In an exemplary embodiment, fins 130 are integrally formed with upper surface 120 and/or other portions of turbine 110 such that fins 130 are fixedly positioned relative to other portions of turbine 110. For example, fins 130 may be continuously connected along an entire length of fins 130 between first and second ends 134, 135 such that the length of fins 130 are joined and cannot move independently of upper surface 120 at the base of each fin 130.

Drive shaft 135 (FIG. 3) can also be integrally molded with turbine 110 so that drive shaft 135 is fixed to turbine 110 and extends downwardly from a lower face of turbine 110. In some embodiments, drive shaft 135 may include a rigid metallic shaft that is retained in a selected position adjacent to a molding during the molding process. The moldable polymer or composite material that is used to form the turbine 110 can then engage with and affix one end of the drive shaft 135.

Exemplary method 200 may also include one or more optional operations 220 and 230. For example, in operation 220, an electrical generator, such as permanent magnet generator 145 (FIG. 3), can be mounted for positioning between turbine 110, rampart 140 and/or base structure 160. Operation 220 may thus including positioning the generator in housing 180 (FIG. 3) and/or a volume defined at least partially by turbine 110, rampart device 140 and/or base structure 160. In another example, operation 230 may include mounting a pump mechanism for positioning between turbine 110, rampart 140 and/or base structure 160. Operation 230 may thus including positioning the pump mechanism in housing 180 and/or a volume defined at least partially by turbine 110, rampart device 140 and/or base structure 160.

Still referring to FIG. 10, exemplary method 200 may include mounting the turbine 110 and/or rampart device 140 to a base structure 160 such that turbine 110 is configured to rotate relative to base structure 160. For example, turbine 110 may rotate about an axis, such as vertical axis A, in response to fluid flowing toward turbine 110 in a flow direction that is generally perpendicular to vertical axis A. Also, exemplary method 200 may include operation 250 of preparing base structure 160, with turbine 110 and/or rampart device 140 mounted thereto, for anchoring into a floor 20 of a body of water. As previously described in connection with FIGS. 1-3, base structure 160 can be equipped with one or more anchors configured to secure the position of turbine system 100 when positioned in a river, stream, ocean or other body of water having water currents.

Figure 11A:
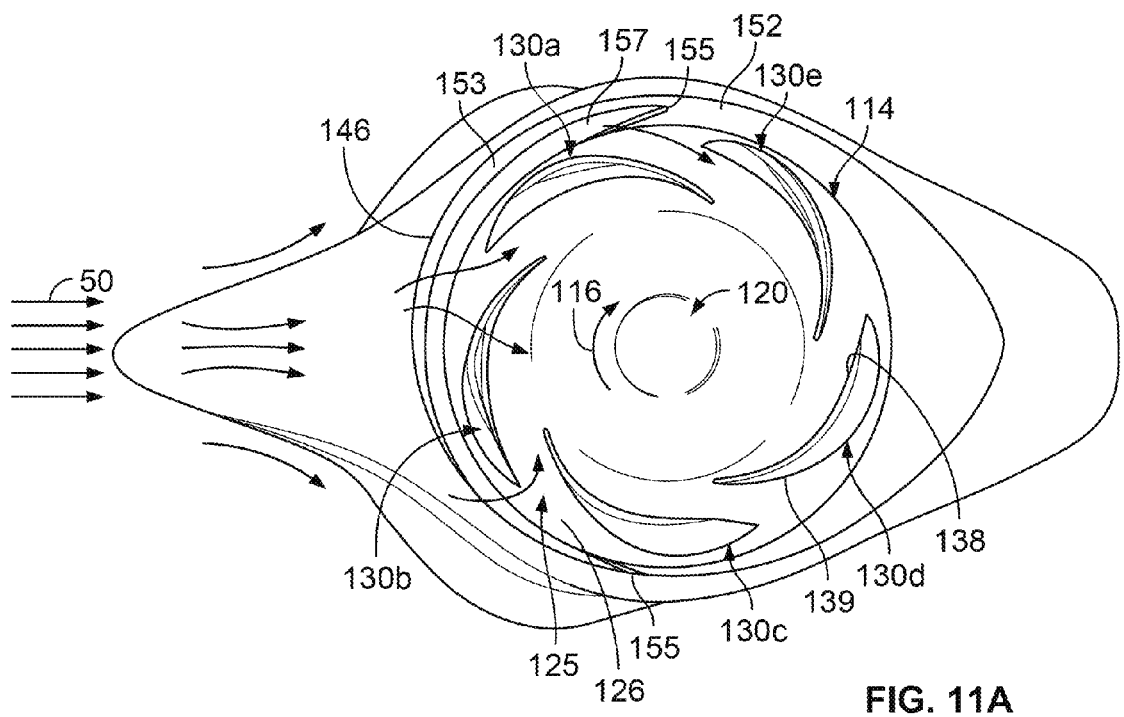
FIGS. 11A-C are top views of a rotation path of a turbine for use with a turbine system such as the system of FIG. 1, in accordance with some embodiments.
Figure 11B:
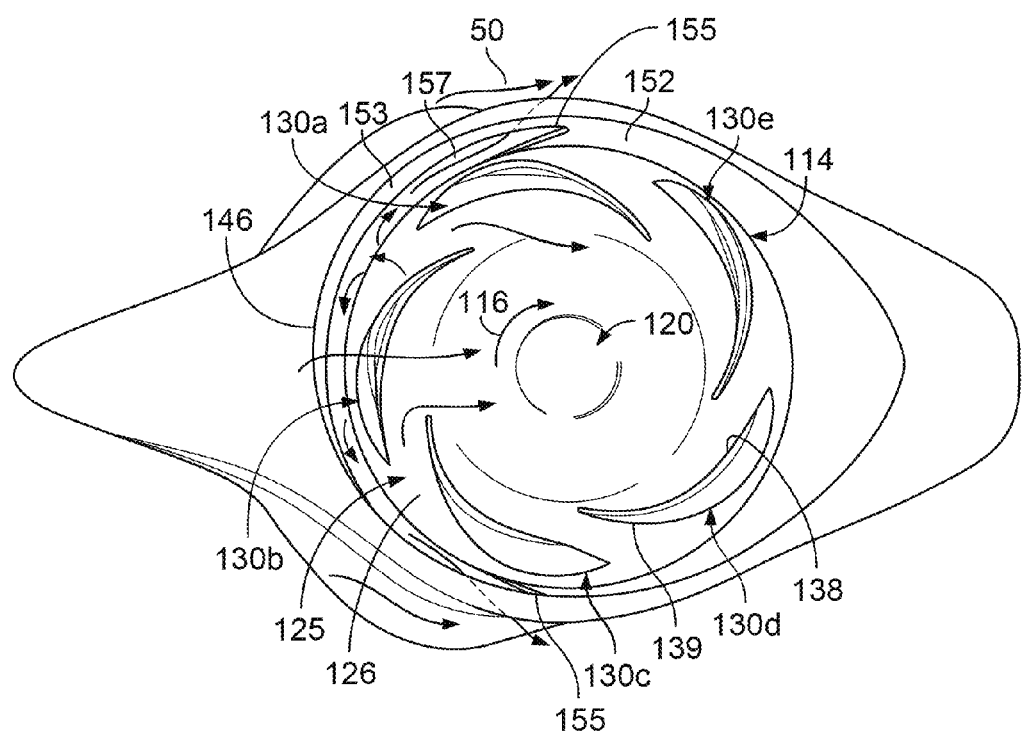
Figure 11C:
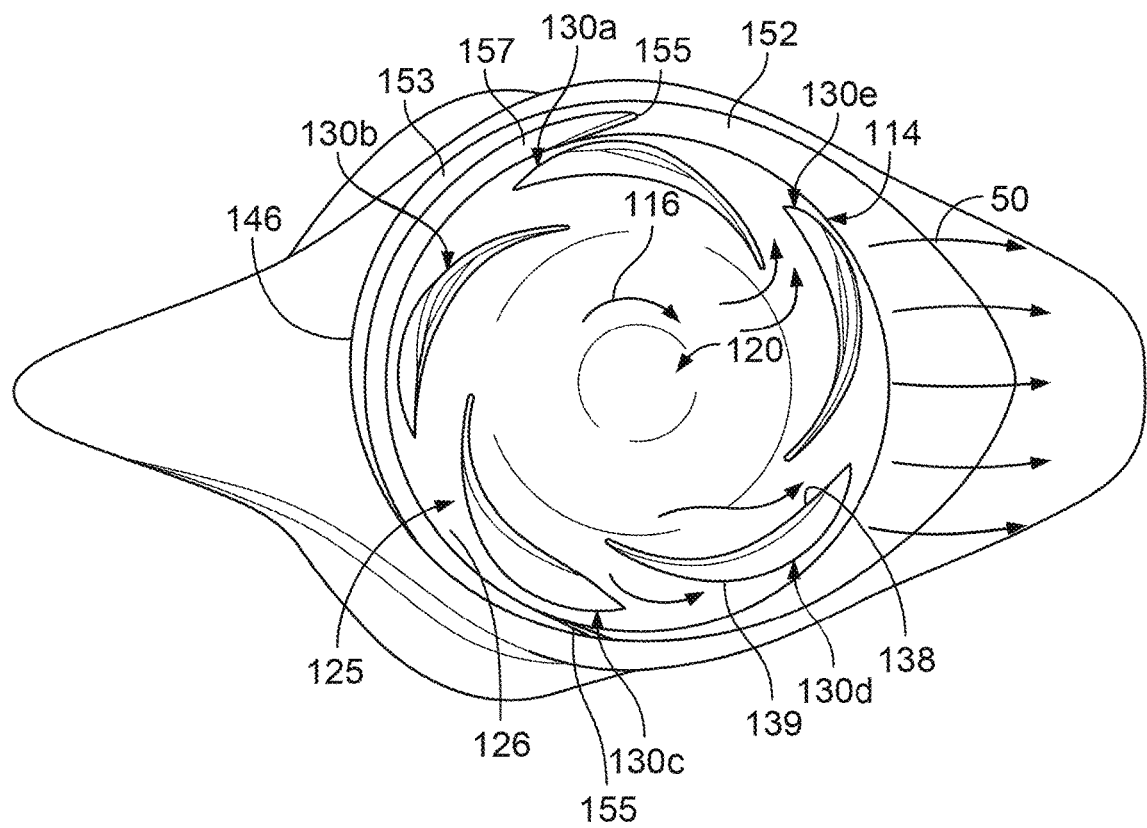

Referring now to FIGS. 11A-C, in use, turbine system 100 can advantageously harness energy from fluid flow 50 in a manner that generates significant levels of electrical power even in relatively slow moving currents. In particular, the shape of turbine 110 and rampart device 140 can provide a synergistic combination of Newtonian forces and a pressure recovery effect to drive the rotary motion 116 of turbine 110. In some embodiments, turbine 110 may thus capture kinetic energy from directional changes to the fluid flow more than once as the fluid flows from rampart device 140 and over the upper face of turbine 110.

In an exemplary embodiment, turbine 110 and rampart device 140 are positioned in fluid flow 50 such that front region 141 faces in an upstream direction. Fluid flow 50 advancing toward front region 141 is split and directed by upwardly sloping surface 144. A portion of fluid flow 50 advances over front region towards turbine 110, while other portions of fluid flow 50 may be directed around respective sides of rampart device 140, and for example over flared regions 151 and proximate apertures 155.

Fluid advancing over front region 141 reaches uppermost portion 146 of rampart device 140. In an exemplary embodiment, at least a portion of turbine 110 is positioned at a vertical height less than uppermost portion 146. Fluid flow 50 advancing towards an upstream portion of turbine 110 thus passes over and/or down through channels 125 of turbine 110. In some exemplary embodiments, fluid flow 50 may accelerate as it flows from front region 141 of rampart device 140 to turbine 110. The shape of fins 130a-e and the upper surface 120 can serve to affect this fluid flow through a number of intense directional changes along the upper face of turbine 110 such that positive rotational motion of turbine 110 is promoted. For example, a portion of fluid flow 50 passing downward and/or through channel 125 between fins 130a and 130b (FIG. 11A) may be redirected, contributing to a positive rotational force on turbine 110. The fluid acts at least on a portion of concave face 132 of fin 130a so as to create Newtonian forces that urge the rotational motion 116 of turbine 110. Fluid flow 50 may thus act upon one or more fins 130 in an upstream position before flowing onward to be harnessed by other portions of turbine 110. Fluid flow 50 may similarly enter one or more other channels 125 of turbine 110 at an upstream portion, such as through channel 125 between fins 130a and 130e and/or between fins 130b and 130c.

In the exemplary embodiment depicted in FIGS. 11A-11C, an uppermost portion 131 of fins 130 is below uppermost portion 146 of rampart device 140 (FIG. 9). Fins 130, and particularly concave faces 132, may be relatively shielded by curved wall 153 of rampart device 140 when in a position proximate front region 141 (e.g. fin 130b in FIG. 11A). Relatively less fluid flow may act on fin 130b in a direction that could result in drag or resistance against rotational motion 116, while fluid flowing over and/or downward from uppermost portion 146 can still facilitate a positive rotational effect on fins proximate front region 141.

As shown in FIG. 11B, fluid flow 50 passing through channels 125 may also be directed towards upper surface 120 by base surfaces 126 and/or surfaces of adjacent fins that in part define channels 125. Upper convex surface 120 directs fluid flow from channels 125 and fluid flow passing downward from front region 141. Fluid flow over an upstream portion of upper surface 120 may stage fluid flow 50 for a pressure recovery effect along downstream portion 114 of turbine 110. For example, fluid flow 50 may exit from channel 125 and travel over upper surface 120 before flowing slightly downward towards concave faces of one or more fins 130 (such as fins 130e, 130d in FIG. 11B).

Fluid within an upstream portion of recess 152 may flow towards and/or through apertures 155 to exit from recess 152 of rampart device 140. For example, a portion of fluid flow 50 passing over uppermost portion 146 may descend into recess 152 between curved wall 153 and turbine 110. Such fluid may readily flow proximate curved wall 153, and in some embodiments within a flow channel 157, before passing through one of apertures 155 to an exterior of rampart device 140. In various exemplary embodiments, fluid may be pushed towards apertures 155 by incoming fluid flow 50 and/or drawn through apertures 155 by a vacuum effect created at least in part by relatively fast moving fluid flow 50 around an exterior of rampart device 140. Accordingly, in some exemplary embodiments, fluid may readily exit recess 152 through apertures 155 to reduce the occurrence of a low pressure region proximate curved wall 153 and/or resistance against desirable rotation of turbine 110.

As shown in FIG. 11C, interference and redirection by fins 120 of fluid flow 50 passing down upper surface 120 and through channels 125 again results in Netownian forces that urge the rotational motion 116 of turbine 110. That is, fins 130 at downstream portion 114 of turbine 110 again capture a directional change of fluid flow to provide a second instance of Netownian forces that urge rotational motion 116 of turbine 110. Fluid flow from upper surface 120 and channels 125 may result in a pressure recovery effect in which a high pressure region 138 is induced proximate concave face 132 of one or more fins 130, such as fin 130d in FIGS. 11B-11C, as compared to a lower pressure region 139 proximate the opposite face. Such a high pressure region can enhance the power acting upon respective fins and contribute to enhanced power generation.

The shape and positioning of fins 130 may be configured to enhance power generation from fluid flow 50 flowing from rampart device 140 and over turbine 110. Ends 134, 135 of fins 130, for example, may be positioned relatively close to outer periphery 111 such that fins 130 are in a generally open position when in a downstream position (e.g. fin 130e in FIG. 11C). Accordingly, as each respective fin 130 moves into a downstream position, proximate tail region 142, for example, each concave face 132 substantially faces towards incoming fluid flow 50 and is positioned close to outer periphery 111. In some exemplary embodiments, outermost location 136 closest to outer periphery 111 is also the location of uppermost portion 131 of fin 130. That is the portion of fin 130 having the greatest height is the portion of fin 130 closes to outer periphery 111. Such a shape and positioning facilitates effective power generation from the kinetic energy of fluid flow 50 by fins 130 of turbine 110. Furthermore, in an exemplary embodiment, fins 130 are fixedly positioned relative to one another and upper surface 120 such that fins 130 are connected to upper surface 120 along an entire length between first and second ends 134, 135. Thus, fins 130 do not significantly bend or flex along a lower edge between first and second ends 134, 134, and Newtonian forces of fluid flow 50 are effectively translated into rotational motion 116.

In various exemplary embodiments, a hydraulic jump effect may result as fluid flow 50 passes over rampart device 140 and turbine 110. That is, a height of fluid flow 50 passing over turbine 110 and rampart device 140 may be higher, and in some configurations visibly higher, proximate front region 141 and lower proximate turbine-receiving region 143 and/or tail region 110. The hydraulic jump effect may result in part from fluid flow 50 having a greater speed upstream of turbine 110 and a lower speed over and/or immediately downstream of turbine 110. The relatively slower fluid flow speed after flowing proximate turbine 110, and/or an associated hydraulic jump effect, may provide a signal of kinetic energy extracted from fluid flow 50 by turbine 110.

Accordingly, the shape and configuration of turbine 110 and rampart device 140 contributes to a synergistic combination of Newtonian forces and a pressure recovery effect to drive rotational motion 116 of turbine 110. Turbine 110 and rampart device 140 cooperate such that positive rotational power may be generated by most or all fins 130 during rotation of turbine 110, and turbine 110 may provide significant rotational power even in relatively slow or varying water currents.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Particular embodiments of the subject matter have been described. Other embodiments are within the scope of the following claims.

What is claimed is:

1. A turbine system for submersed use in an electrical generation system, comprising:
   a vertical-axis turbine that rotates about an axis in response to fluid flowing toward the turbine in a flow direction that is generally perpendicular to the axis, the vertical-axis turbine including a upper surface and a plurality of upwardly protruding fins extending from an outer region proximate an outer periphery of the vertical-axis turbine; and
   a rampart device positioned at least partially under the vertical-axis turbine and configured to remain generally stationary during rotation of the vertical-axis turbine, the rampart device including a front region and a tail region, at least a portion of the front region extending to a vertical height greater than an outer periphery of the vertical-axis turbine, and a turbine-receiving region defined at least in part by a curved wall having a height that is greater near the front region than at the tail region.

2. The turbine system of claim 1, wherein at least a portion of the front region of the rampart device extends to a vertical height greater than an uppermost portion of the vertical-axis turbine when positioned for use.

3. The turbine system of claim 2, wherein the uppermost portion of the vertical-axis turbine is a ridge of a fin.

4. The turbine system of claim 1, wherein the front region of the rampart device comprises an upwardly sloping surface extending between a leading edge of the rampart device and an uppermost portion of the rampart device.

5. The turbine system of claim 1, wherein the turbine-receiving region of the rampart device defines a recess, the vertical-axis turbine positionable at least partially within the recess.

6. A turbine system for submersed use in an electrical generation system, comprising:
   a vertical-axis turbine that rotates about an axis in response to fluid flowing toward the turbine in a flow direction that is generally perpendicular to the axis, the vertical-axis turbine including a upper surface and a plurality of upwardly protruding fins extending from an outer region proximate an outer periphery of the vertical-axis turbine; and
   a rampart device positioned at least partially under the vertical-axis turbine and configured to remain generally stationary during rotation of the vertical-axis turbine, the rampart device including a front region, at least a portion of the front region extending to a vertical height greater than an outer periphery of the vertical-axis turbine;
   wherein the rampart device further comprises a tail region and a turbine-receiving region positioned at least partially between the front region and the tail region;
   wherein the turbine-receiving region of the rampart device defines a recess, the vertical-axis turbine positionable at least partially within the recess; and
   wherein the recess is defined at least in part by a curved wall having a height that is greater near the front region than at the tail region.

7. The turbine system of claim 6, wherein the curved wall comprises an aperture extending through the wall between an interior of the recess and an exterior of the rampart device.

8. The turbine system of claim 1, wherein the rampart device is asymmetric about the vertical axis.

9. The turbine system of claim 1, wherein the rampart device comprises a tail portion having an upwardly facing major surface, at least a portion of the upwardly facing major surface positioned below an outer periphery of the vertical-axis turbine.

10. The turbine system of claim 1, wherein at least the front region and turbine-receiving region of the rampart device are an integrally formed, unitary structure.

11. The turbine system of claim 1, wherein the upwardly protruding fins of the vertical-axis turbine extend to a vertical height greater than an uppermost portion of the upper surface.

12. The turbine system of claim 1, wherein the vertical-axis turbine includes a continuously solid upward facing surface having a generally circular outer periphery.

13. The turbine system of claim 1, wherein the upper surface and upwardly protruding fins are an integrally formed, unitary structure.

14. The turbine system of claim 1, wherein the fins are fixedly positioned relative to the upper surface.

15. The turbine system of claim 1, wherein each fin includes opposite convex and concave surfaces, and both of the convex and concave surfaces are upwardly facing surfaces.

16. The turbine system of claim 1, further comprising a base structure positioned below the vertical-axis turbine and including one or more anchor legs extending away from the vertical-axis turbine.

17. The turbine system of claim 1, further comprising a drive shaft extending from the vertical-axis turbine to an electrical generator component.

18. The turbine system of claim 1, wherein the upper surface comprises a convex surface.

19. The turbine system of claim 1, further comprising an electrical generator positioned to generate power in response to rotation of the vertical-axis turbine.

20. The turbine system of claim 19, wherein the electrical generator is electrically connected to an onshore electronics system that conditions electrical power for output to an external power grid.

21. A method of using a turbine system for generating electrical power from fluid flow, comprising:
    positioning a turbine and rampart device underwater, the turbine including a continuously solid upward facing surface and a plurality of upwardly protruding fins extending from an outer region proximate an outer periphery of the turbine, the rampart device positioned at least partially under the turbine and configured to remain generally stationary during rotation of the turbine, the rampart device including a front region and a tail region, at least a portion of the front region extending to a vertical height greater than an outer periphery of the turbine, and a turbine-receiving region defined at least in part by a curved wall having a height that is greater near the front region than at the tail region; and
    generating electrical power in response to rotation of the turbine caused by water flowing over the rampart device and turbine and interacting with the plurality of fins.

22. The method of claim 21, wherein the turbine is a vertical-axis turbine configured to rotate about a vertical axis in response to fluid flowing toward the turbine in a flow direction that is generally perpendicular to the vertical axis.

23. The method of claim 21, wherein at least a portion of the front region of the rampart device extends to a vertical height greater than an uppermost portion of the turbine when positioned for use.

24. A turbine system for use in an electrical generation system, comprising:
    a turbine that rotates about a vertical axis in response to fluid flowing toward the turbine in a flow direction that is generally perpendicular to the vertical axis, the turbine including a upper surface and a plurality of upwardly protruding fins extending from an outer region proximate an outer periphery of the turbine, the upper surface and fins forming a continuously solid upward facing surface, and the upwardly protruding fins extend to a height greater than an uppermost portion of the upper surface;
    a rampart device positioned at least partially under the turbine and configured to remain generally stationary during rotation of the turbine, the rampart device including a front region and a tail region, at least a portion of the front region extending to a vertical height greater than the upwardly protruding fins, and a turbine-receiving region defined at least in part by a curved wall having a height that is greater near the front region than at the tail region;
    an electrical generator connected with the turbine so as to generate electrical power in response to rotation of the turbine; and
    an onshore electronics system electrically connected to the electrical generator that conditions electrical power for output to an external power grid.

25. The system of claim 24, wherein the turbine is a vertical-axis turbine configured to rotate about a vertical axis in response to fluid flowing toward the turbine in a flow direction that is generally perpendicular to the vertical axis.

26. The system of claim 24, wherein at least a portion of the front region of the rampart device extends to a vertical height greater than an uppermost portion of the turbine when positioned for use.

27. The system of claim 24, wherein the upwardly protruding fins of the turbine extend to a vertical height greater than an uppermost region of the upper surface.

28. The system of claim 24, wherein each fin includes opposite convex and concave surfaces, and both of the convex and concave surfaces are upwardly facing surfaces.

29. The turbine system of claim 1, wherein the curved wall comprises an aperture extending through the wall between an interior of the recess and an exterior of the rampart device.

* * * * *